US008622862B2

(12) United States Patent
Koyama et al.

(10) Patent No.: US 8,622,862 B2
(45) Date of Patent: Jan. 7, 2014

(54) POWER TRANSMITTING DEVICE

(75) Inventors: Shigeru Koyama, Saitama (JP); Takefumi Ikegami, Saitama (JP); Noriyuki Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 13/148,922

(22) PCT Filed: Mar. 24, 2010

(86) PCT No.: PCT/JP2010/055127
§ 371 (c)(1),
(2), (4) Date: Aug. 10, 2011

(87) PCT Pub. No.: WO2010/110343
PCT Pub. Date: Sep. 30, 2010

(65) Prior Publication Data
US 2012/0004063 A1  Jan. 5, 2012

(30) Foreign Application Priority Data

Mar. 24, 2009  (JP) ................................ 2009-071714

(51) Int. Cl.
*F16H 3/72* (2006.01)
*F16H 37/06* (2006.01)
*B60K 6/20* (2007.10)
*F16H 19/00* (2006.01)

(52) U.S. Cl.
USPC ................................ 475/5; 74/330; 180/65.21

(58) Field of Classification Search
USPC .................................................. 475/5; 74/330
See application file for complete search history.

(56) References Cited

U.S. PATENT DOCUMENTS

| 6,634,986 | B2 * | 10/2003 | Kima | 477/107 |
| 8,328,672 | B2 * | 12/2012 | Akutsu et al. | 475/5 |
| 8,517,876 | B2 * | 8/2013 | Sakai et al. | 475/5 |
| 2002/0033059 | A1 | 3/2002 | Pels et al. | |

FOREIGN PATENT DOCUMENTS

| DE | 199 40 288 C1 | 3/2001 |
| DE | 10 2007 022 774 A1 | 11/2008 |
| EP | 0 800 949 A2 | 10/1997 |

(Continued)

OTHER PUBLICATIONS

Japanese Office Action, Japanese Patent Application No. 2011-506102 dated Aug. 6, 2013.

(Continued)

*Primary Examiner* — David D Le
*Assistant Examiner* — Colby M Hansen
(74) *Attorney, Agent, or Firm* — Arent Fox LLP

(57) ABSTRACT

A power transmitting device 1 having: first and second main input shafts 11, 12 connected to engine 2 via clutches C1 and C2; idler shaft 17 parallel to the first main input shaft 11; a sub input shaft 13 parallel to the idler shaft 14; gears 17a and 17b of an output shaft 17 allowing gears 18a and 18b disposed on the first input shaft 11 and selectively connected to the output shaft 17, and gears 19a and 19b able to connect the sub input shaft 13 and the output shaft 17, to engage with gears 17a and 17b in common; and a differential rotation mechanism 9, allowing a sun gear 9s on the first input shaft 11 and an electric motor 3, a carrier 9c connected to gear 18a, and a ring gear 9r connected to a synchronizer SL to rotate differentially with respect to one another.

10 Claims, 26 Drawing Sheets

(56) References Cited

FOREIGN PATENT DOCUMENTS

| | | |
|---|---|---|
| EP | 1 826 462 A2 | 8/2007 |
| JP | 2002-089594 A | 3/2002 |
| JP | 2005-329813 A | 12/2005 |
| JP | 2007-246057 A | 9/2007 |
| JP | 2009-036354 A | 2/2009 |
| JP | 2009-511328 A | 3/2009 |
| WO | WO 2007/042109 A1 | 4/2007 |
| WO | WO 2010/101296 A1 | 9/2010 |

OTHER PUBLICATIONS

European Office Action, European Patent Application No. 10756139.1 dated Sep. 30, 2013.

* cited by examiner

FIG.3

|  | S1 | S2 | SR | SL | C1 | C2 |
|---|---|---|---|---|---|---|
| 1st | - | - | - | ROCK | ON | OFF |
| 1st Pre2nd | - | 2 | - | ROCK | ON | OFF |
| 2nd Pre1st | - | 2 | - | - | OFF | ON |
| 2nd | - | 2 | - | - | OFF | ON |
| 2nd Pre3rd | 3 | 2 | - | - | OFF | ON |
| 3rd Pre2nd | 3 | 2 | - | - | ON | OFF |
| 3rd | 3 | - | - | - | ON | OFF |
| 3rd Pre4th | 3 | 4 | - | - | ON | OFF |
| 4th Pre3rd | 3 | 4 | - | - | OFF | ON |
| 4th | - | 4 | - | - | OFF | ON |
| 4th Pre5th | 5 | 4 | - | - | OFF | ON |
| 5th Pre4th | 5 | 4 | - | - | ON | OFF |
| 5th | 5 | - | - | - | ON | OFF |
| Rev | - | 2 | R | - | ON | OFF |

FIG.6

|  | S1 | S2 | S3 | S4 | SR | SL | C1 | C2 |
|---|---|---|---|---|---|---|---|---|
| 1st | - | - | - | - | - | ROCK | ON | OFF |
| 1st Pre2nd | - | 2 | - | - | - | ROCK | ON | OFF |
| 2nd Pre1st | - | 2 | - | - | - | - | OFF | ON |
| 2nd | - | 2 | - | - | - | - | OFF | ON |
| 2nd Pre3rd | 3 | 2 | - | - | - | - | OFF | ON |
| 3rd Pre2nd | 3 | 2 | - | - | - | - | ON | OFF |
| 3rd | 3 | - | - | - | - | - | ON | OFF |
| 3rd Pre4th | 3 | - | - | 4 | - | - | ON | OFF |
| 4th Pre3rd | 3 | - | - | 4 | - | - | OFF | ON |
| 4th | - | - | - | 4 | - | - | OFF | ON |
| 4th Pre5th | - | - | 5 | 4 | - | - | OFF | ON |
| 5th Pre4th | - | - | 5 | 4 | - | - | ON | OFF |
| 5th | - | - | 5 | - | - | - | ON | OFF |
| 5th Pre6th | - | 6 | 5 | - | - | - | ON | OFF |
| 6th Pre5th | - | 6 | 5 | - | - | - | OFF | ON |
| 6th | - | 6 | - | - | - | - | OFF | ON |
| 6th Pre7th | 7 | 6 | - | - | - | - | OFF | ON |
| 7th Pre6th | 7 | 6 | - | - | - | - | ON | OFF |
| 7th | 7 | - | - | - | - | - | ON | OFF |
| Rev | - | 2 |  | - | R | - | ON | OFF |

POWER TRANSMITTING DEVICE

CROSS-REFERENCED TO RELATED APPLICTION

This application is a National Stage entry of International Application PCT/JP2010/055127, filed Mar. 24, 2010, which claims priority of Japanese Patent Application No. 2009-071714, filed Mar. 24, 2009, the disclosure of the prior applications are hereby incorporated in its entirety by reference.

TECHNICAL FIELD

The present invention relates to a power transmitting device for a hybrid vehicle including an internal combustion engine and an electric motor.

BACKGROUND ART

There is a power transmitting device for a hybrid vehicle that is capable of combining motive power output from an internal combustion engine and motive power output from an electric motor and transmitting the combined motive power to driving wheels and capable of performing a regenerative operation in an electric motor. As this type of approach, there has been conventionally known a method of decelerating or accelerating the motive power input from the output of the internal combustion engine and once transmitting the motive power to two shafts parallel to an output shaft of the internal combustion engine and thereafter returning the motive power to an output shaft coaxial with the output shaft of the internal combustion engine.

For example, the transmission described in Patent Document 1 has two shafts parallel to an output shaft of an internal combustion engine. Each of the two shafts is connected to the output shaft of the internal combustion engine via a clutch, and an electric motor is connected to one end of one of the two shafts (hereinafter, referred to as "first shaft"). In addition, on the first shaft, there is disposed a synchronizer, which selectively connects a plurality of even-numbered stage gears to the first shaft. On the other of the two shafts (hereinafter, referred to as "second shaft"), there is disposed a synchronizer, which selectively connects a plurality of odd-numbered stage gears and reverse stage gears to the second shaft. The gears fixed to the output shaft are engaged with the even-numbered stage gears and the odd-numbered stage gears in common.

PRIOR ART DOCUMENT

Patent Document

Patent Document 1: Japanese Patent Application Laid-Open No. 2002-89594

SUMMARY OF THE INVENTION

Problems to be Solved by the Invention

The transmission described in Patent Document 1, however, has a disadvantage that the length of the transmission increases in the axial direction according to the number of stages and therefore it is difficult to install the transmission in the case of a small space for housing the transmission in the vehicle. Particularly, when the engine is mounted transversely (the shaft length is oriented in the vehicle width direction) in an FF layout vehicle, it is difficult to install the transmission.

In view of the above background, the present invention has been made. Therefore, it is an object of the present invention to provide a power transmitting device for a hybrid vehicle, which includes an internal combustion engine and an electric motor, the power transmitting device capable of reducing the axial length.

Means for Solving the Problems

The present invention provides a power transmitting device for a hybrid vehicle having an internal combustion engine and an electric motor, the power transmitting device including: a first main input shaft, which is disposed parallel to an internal combustion engine output shaft, to which motive power is input from the internal combustion engine, and which is connected to the internal combustion engine output shaft by placing a first make-and-break device in a connected state; a second main input shaft, which is disposed coaxially with the first main input shaft and connected to the internal combustion engine output shaft by placing the second make-and-break device in a connected state; an intermediate input shaft disposed parallel to the first main input shaft; a sub input shaft disposed parallel to the intermediate input shaft; an output shaft, which is disposed parallel to the first main input shaft and outputs motive power to a driven unit via a counter shaft; a first gear group, which is disposed on the first main input shaft and is composed of a plurality of gears selectively connected to the output shaft via a first synchronizer; a second gear group, which is disposed on the sub input shaft and is composed of a plurality of gears selectively connecting the sub input shaft to the output shaft via a second synchronizer; a third gear group, which is fixed to the output shaft and is composed of a plurality of gears engaged with the gears of the first gear group and the gears of the second gear group in common; and a differential rotation mechanism composed of a first rotating element, a second rotating element, and a third rotating element so as to be rotatable differentially with respect to one another, wherein: the first rotating element is connected to the first main input shaft and the electric motor; the second rotating element is connected to the first gear group; the third rotating element is connected to a fixing mechanism capable of placing the third rotating element in a fixed state; and the second rotating element decelerates the motive power transmitted from the first rotating element by using a reaction force from the third rotating element, which is placed in the fixed state by the fixing mechanism (First aspect of the invention).

According to the first aspect of the invention, with the fixing mechanism operated so as to place the third rotating element in the fixed state and the first synchronizer operated so as to connect any gear of the first gear group to the output/ input shaft, the first make-and-break device is placed in the connected state, and then the motive power of the internal combustion engine is transmitted to the first rotating element via the first main input shaft and/or the motive power of the electric motor is transmitted to the first rotating element. At this time, the second rotating element of the power combining mechanism decelerates and outputs the motive power, which has been transmitted to the first rotating element. Then, the motive power is output to the driven unit via the first sub input shaft and the output shaft. In this manner, in the first aspect of the invention, the vehicle is able to start and run with the first synchronizer and the second synchronizer placed in the neutral state. Therefore, in the case of having the same number of variable speed gear pairs as those of the transmission described in Patent Document 1, the power transmitting device has one more variable speed stage, thereby enabling a reduction in the axial length.

Moreover, in the above state, the electric motor is able to perform the regenerative operation by using the motive power transmitted from the internal combustion engine to the first rotating element via the first main input shaft. In this manner, in the first aspect of the invention, the vehicle is able to start and run with the first synchronizer and the second synchronizer placed in the neutral state while the electric motor performs the regenerative operation. Therefore, it is possible to achieve a mode of the start and running different from the mode of the start and running described in the preceding paragraph. Further, the electric motor performs the regenerative operation in this mode, and therefore the mode is favorable in the case where the battery charge level drops down or the like.

The present invention provides a power transmitting device for a hybrid vehicle having an internal combustion engine and an electric motor, the power transmitting device including: a main input shaft, to which motive power is input from the internal combustion engine; a first sub input shaft, which is disposed parallel to the main input shaft and is selectively connected to the main input shaft via a pair of reduction gears by a first make-and-break device; a second sub input shaft, which is disposed parallel to the main input shaft and selectively connected to the main input shaft via a pair of speed increasing gears by a second make-and-break device; an output shaft, which is disposed coaxially with the main input shaft and outputs motive power to a driven unit via a counter shaft; a first gear group, which is disposed on the first sub input shaft and is composed of a plurality of gears selectively connected to the first sub input shaft via a first synchronizer; a second gear group, which is disposed on the second sub input shaft and is composed of a plurality of gears selectively connected to the second sub input shaft via a second synchronizer; a third gear group, which is fixed to the output shaft and is composed of a plurality of gears engaged with the gears of the first gear group and the gears of the second gear group in common; and a differential rotation mechanism composed of a first rotating element, a second rotating element, and a third rotating element so as to be rotatable differentially with respect to one another, wherein: one of the first sub input shaft and the second sub input shaft is connected to the first rotating element and the other is able to transmit motive power to the output shaft without using the differential rotation mechanism; the first rotating element is connected to the main input shaft; the third rotating element is connected to the electric motor; and the second rotating element combines motive power transmitted from the first rotating element with motive power transmitted from the third rotating element and transmits the combined motive power to the output shaft (Second aspect of the invention).

According to the second aspect of the invention, the first make-and-break device or the second make-and-break device is set to the connected state so that the first sub input shaft or the second sub input shaft connected to the first rotating element (hereinafter, the sub input shaft is referred to as "connected sub input shaft") is connected to the main input shaft. In addition, with the first synchronizer and the second synchronizer set to the neutral state in which the first sub input shaft and the second sub input shaft are not connected to any gear, the motive power is input from the internal combustion engine to the main input shaft and the electric motor performs the power operation so that the third rotating element rotates. At this time, the second rotating element of the differential rotation mechanism combines the motive power transmitted from the internal combustion engine to the first rotating element via the connected sub input shaft with the motive power transmitted from the electric motor to the third rotating element and transmits the combined motive power to the output shaft, and the combined motive power is output to the driven unit. In this manner, in the second aspect of the invention, the vehicle is able to start and run with the first synchronizer and the second synchronizer placed in the neutral state. Therefore, in the case of having the same number of variable speed gear pairs as those of the transmission described in Patent Document 1, the power transmitting device has one more variable speed stage, thereby enabling a reduction in the axial length.

Moreover, in the above state, the motive power transmitted from the internal combustion engine to the first rotating element via the connected sub input shaft is also able to be distributed to the second rotating element and the third rotating element. At this time, the motive power is output to the driven unit via the second rotating element and the electric motor performs the regenerative operation via the third rotating element. In this manner, in the second aspect of the invention, the vehicle is able to start and run with the first synchronizer and the second synchronizer placed in the neutral state while the electric motor performs the regenerative operation. Therefore, it is possible to achieve a mode of the start and running different from the mode of the start and running described in the preceding paragraph. Further, the electric motor performs the regenerative operation in this mode, and therefore the mode is favorable in the case where the battery charge level drops down or the like.

Moreover, in the second aspect of the invention, preferably the main input shaft is disposed parallel to the internal combustion engine output shaft, to which motive power is input from the internal combustion engine, and is composed of a first main input shaft connected to the internal combustion engine output shaft by placing the first make-and-break device in a connected state and a second main input shaft, which is disposed coaxially with the first main input shaft and is connected to the internal combustion engine output shaft by placing the second make-and-break device in the connected state, and any one of the first main input shaft and the second main input shaft is connected to the first rotating element, by which any one of the first sub input shaft and the second sub input shaft is connected to the first rotating element.

In this case, the first main input shaft and the second main input shaft constituting the main input shaft are disposed coaxially with each other. Therefore, the first make-and-break device and the second make-and-break device are able to be disposed adjacent to each other, thereby enabling the power transmitting device for a hybrid vehicle to be further downsized. Moreover, a device, which operates the first make-and-break device and the second make-and-break device, is able to be used in common, thereby enabling a reduction in cost.

Further, in the second aspect of the invention, preferably the power transmitting device has a reverse gear mechanism, which selectively connects the pair of reduction gears and the pair of speed increasing gears to each other.

In this case, the first make-and-break device or the second make-and-break device is set to the connected state so that the connected sub input shaft is connected to the main input shaft. In addition, with the first synchronizer and the second synchronizer set to the neutral state in which the first sub input shaft and the second sub input shaft are not connected to any gear and the reverse gear mechanism connected, the motive power is input from the internal combustion engine to the main input shaft and the motive power is applied from the electric motor to rotate the third rotating element. At this time, the second rotating element of the differential rotation mechanism combines the motive power in the reverse rotation direction transmitted from the internal combustion engine to the first rotating element via the connected sub input shaft with the motive power transmitted from the electric motor to the third rotating element and transmits the combined motive power to the output shaft, and the combined motive power is output to the driven unit. In this manner, in this invention, the vehicle is able to move backward with the first synchronizer and the second synchronizer placed in the neutral state. In addition, the reverse gear mechanism is able to be disposed parallel to the main output shaft as described above. This enables a reduction in the axial length by the reverse stage in comparison with the transmission described in Patent Document 1.

Moreover, in the above state, the motive power transmitted from the internal combustion engine to the first rotating element via the connected sub input shaft is also able to be distributed to the second rotating element and the third rotating element. At this time, the motive power is output to the driven unit via the second rotating element and the electric motor performs the regenerative operation via the third rotating element. In this manner, in this invention, the vehicle is able to move backward with the first synchronizer and the second synchronizer placed in the neutral state while the electric motor performs the regenerative operation. Therefore, it is possible to achieve a mode of moving backward different from the mode of moving backward described in the preceding paragraph. Further, the electric motor performs the regenerative operation in this mode, and therefore the mode is favorable in the case where the battery charge level drops down or the like.

Moreover, in the first and second aspects of the invention, preferably at least one of the first make-and-break element and the second make-and-break element is a dry clutch.

This enables a reduction in make-and-break time and a reduction in size of the make-and-break elements in comparison with the case where the first make-and-break element and the second make-and-break element are wet clutches. A shock caused by a change in motive power generated by engine braking or the like is able to be reduced by controlling the electric motor.

Further, in the first and second aspects of the invention, preferably the differential rotation mechanism is a planetary gear unit coaxially having a sun gear, a ring gear, and a carrier, which rotatably supports a plurality of planetary gears engaged with the sun gear and the ring gear between the sun gear and the ring gear, as three single-pinion type rotating elements, and the first rotating element is the sun gear, the second rotating element is the carrier, and the third rotating element is the ring gear.

In this case, the differential rotation mechanism is able to be formed in a simple configuration, thereby enabling downsizing and a decrease in cost. Further, the configuration enables a distribution of the motive power and an increase in transmission efficiency.

Moreover, in the first and second aspects of the invention, preferably the gears of the first gear group engage with the gears of the third gear group to form a plurality of odd-numbered speed gear pairs and the gears of the second gear group engage with the gears of the third gear group to form a plurality of even-numbered speed gear pairs.

In this case, a state in which the vehicle starts and runs with the first synchronizer and the second synchronizer placed in the neutral state is able to be defined as a first speed stage.

Moreover, in the first and second aspects of the invention, preferably the gears of the first gear group engage with the gears of the third gear group to form a plurality of even-numbered speed gear pairs and the gears of the second gear group engage with the gears of the third gear group to form a plurality of odd-numbered speed gear pairs.

In this case, a state in which the vehicle starts and runs with the first synchronizer and the second synchronizer placed in the neutral state is able to be defined to be equivalent to a variable speed stage lower than the first speed stage (super low stage).

Moreover, in the first and second aspects of the invention, preferably a part or all of a rotating body, a static part, and an armature winding, which constitute the electric motor are disposed so as to be superposed over the differential rotation mechanism in a direction perpendicular to the direction of axis of the output shaft.

In this case, the axial length of the power transmitting device is able to be reduced.

Further, in the first and second aspects of the invention, preferably the power transmitting device includes a requested power setting element, which sets requested power requested for the output shaft, and a control element, which performs the operation of the internal combustion engine and the operation of the electric motor according to the requested power set by the requested power setting element.

In this case, the control element enables the operations of the internal combustion engine and the electric motor to be favorably performed and the requested power to be output from the output shaft.

Moreover, in the first and second aspects of the invention, preferably the control element controls the operation of the electric motor so that the internal combustion engine performs the operation within a range of a stall region to a maximum rotation region.

In this case, the internal combustion engine performs the operation only within the range of the stall region to the maximum rotation region, and therefore the internal combustion engine is able to be favorably used, thus making the fuel consumption, lifetime, and the like of the internal combustion engine favorable.

Moreover, in the first and second aspects of the invention, preferably the control element performs the operation of the internal combustion engine within an appropriate operating region of the internal combustion engine, and the control element compares the motive power of the internal combustion engine transmitted from the first rotating element to the second rotating element with the requested power and controls the electric motor to perform a power operation in the case where the motive power of the internal combustion engine is less than the requested power and to perform the regenerative operation in the case where the motive power of the internal combustion engine exceeds the requested power.

In this case, the internal combustion engine performs the operation within the appropriate operating region and therefore the internal combustion engine is able to be favorably used, thereby making the fuel consumption, lifetime, and the like of the internal combustion engine favorable. Further, the electric motor performs the power operation or the regenerative operation according to whether a difference between the motive power of the internal combustion engine and the requested power is positive or negative, by which the requested power is able to be always output from the output shaft.

Further, in the first and second aspects of the invention, preferably the control element controls the electric motor to perform the operation at a rated output or maximum rpm in the case where the electric motor performs the operation at an output or rpm exceeding the rated output or the maximum rpm.

In this case, the electric motor performs the operation at an output or rpm equal to or less than the rated output and the maximum rpm. Therefore, the electric motor is able to be favorably used, thereby achieving good lifetime of the electric motor.

BRIEF DESCRIPTION OF THE DRAWINGS

FIG. 3 is a table illustrating the operating states of respective portions in variable speed stages in an engine running mode of the power transmitting device;

FIG. 6 is a table illustrating the operating states of respective portions in variable speed stages in the engine running mode of the power transmitting device;

MODE FOR CARRYING OUT THE INVENTION

[First Embodiment]

A power transmitting device 1 for a hybrid vehicle according to a first embodiment of the present invention will be described below with reference to accompanying drawings.

Figure 1:
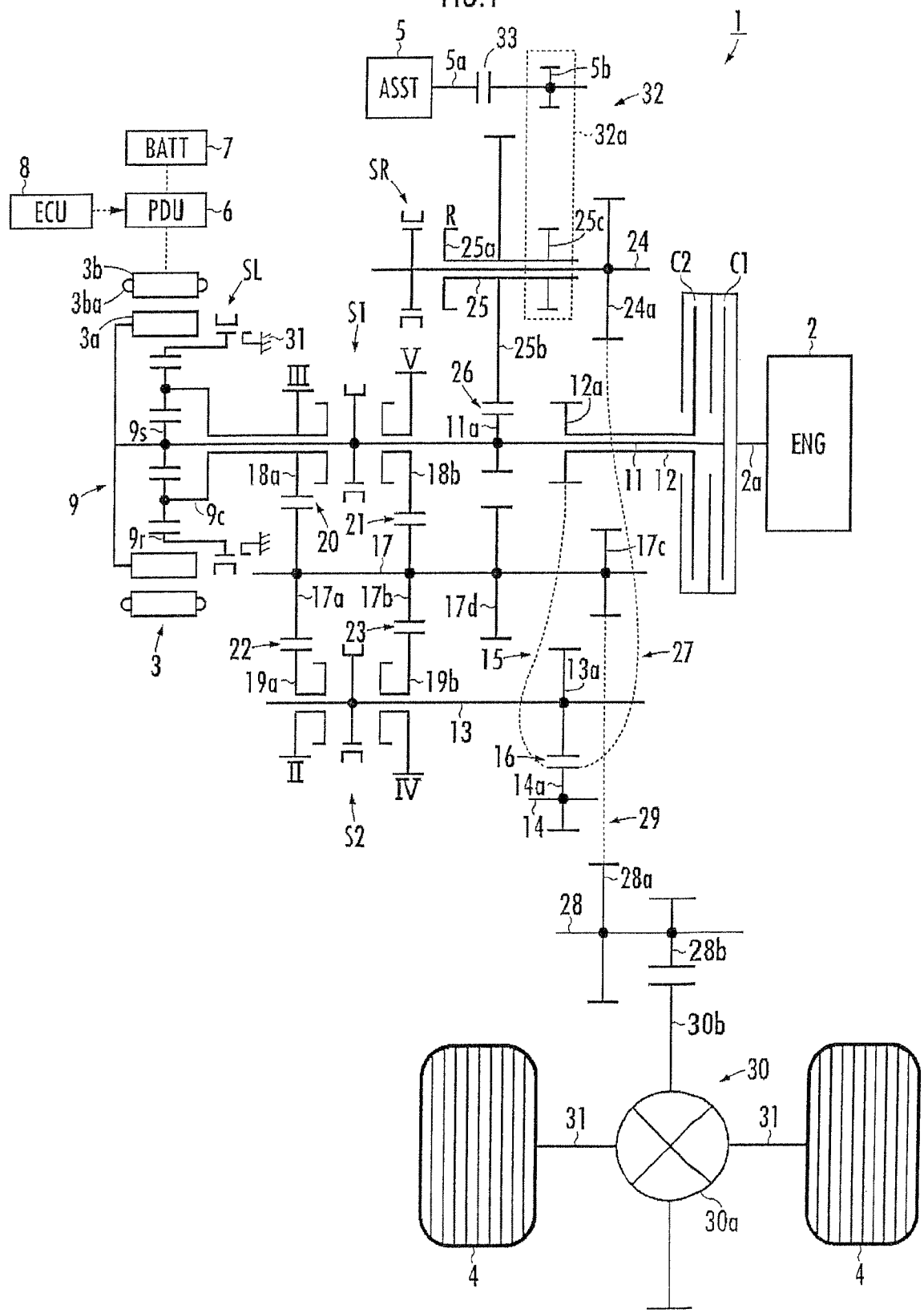
FIG. 1 is a diagram schematically illustrating the general configuration of a vehicle having a power transmitting device for a hybrid vehicle according to a first embodiment of the present invention.

First, the configuration of the power transmitting device 1 will be described with reverence to FIG. 1. The power transmitting device 1 is a dual clutch automated manual transmission (DCT) mounted on a hybrid vehicle and includes an engine (an internal combustion engine) 2 and an electric motor (a motor generator) 3 as power generation sources. In addition, the power transmitting device 1 is configured to transmit motive power (a driving force) of the engine 2 or/and of the electric motor 3 to a pair of driving wheels 4 and 4, which are driven units, to drive the driving wheels 4 and 4. Further, the power transmitting device 1 is configured to transmit the motive power of the engine 2 or/and of the electric motor 3 not only to the driving wheels 4 and 4, but also to an auxiliary device 5, which is mounted on the vehicle, to drive the auxiliary device 5. The auxiliary device 5 is, for example, a compressor of an air conditioner, a water pump, an oil pump, or the like.

The engine 2 is an internal combustion engine, which generates motive power (torque) by burning fuel such as gasoline, light oil, or alcohol, and has an output shaft 2a for use in outputting the generated motive power to the outside. In the same manner as a normal automobile engine, the engine 2 adjusts the motive power, which is output from the engine 2 via the output shaft 2a by controlling the opening degree of a throttle valve provided in an intake path, which is not illustrated (controlling the intake air amount of the engine 2).

The electric motor 3 is a three-phase brushless DC motor in this embodiment and includes a hollow rotor (a rotating body) 3a, which is rotatably supported in a housing (not illustrated) of the electric motor 3, and a stator (a static part) 3b, which is fixed to the housing around the rotor 3a. The rotor 3a is provided with a plurality of permanent magnets attached thereto and the stator 3b is provided with a three-phase coil (an armature winding) 3ba attached thereto. The stator 3b of the electric motor 3 is provided in a fixed manner to the housing, which is provided in an immovable part, which is stationary relative to the vehicle body, such as an outer case of the power transmitting device 1.

The coil 3ba of the electric motor 3 is electrically connected to a battery (a secondary battery) 7 as a DC power supply via a power drive unit (hereinafter, referred to as "PDU") 6, which is a drive circuit including an inverter circuit. In addition, a PDU 6 is electrically connected to an electronic control unit (hereinafter, referred to as "ECU") 8.

The ECU 8 is electrically connected to the engine 2 and the like, though not illustrated, in addition to the PDU 6 and controls the operation of the power transmitting device 1 including the engine 2. The ECU 8 functions as a requested power setting element, which sets the motive power required to be transmitted to the driving wheels 4 and 4 on the basis of the vehicle speed or the revolutions per minute (rpm) of the engine 2, and functions as a control element, which drives the engine 2 or the electric motor 3 according to requested power set by the requested power setting element.

The ECU 8 controls the electric current, which flows through the coil 3ba, via the PDU 6, thereby adjusting the motive power (the torque) that the electric motor 3 outputs from the rotor 3a. In this case, the electric motor 3 performs a power operation for generating a power torque in the rotor 3a by means of electric power supplied from the battery 7 to function as a motor by the control of the PDU 6. Specifically, the electric power supplied to the stator 3b is converted to motive power and output to the rotor 3a. Further, with the control of the PDU 6, the electric motor 3 generates electricity by means of rotational energy given to the rotor 3a from the outside and performs a regenerative operation for generating a regenerative torque in the rotor 3a while giving the electric power energy to the battery 7 to function as a generator. Specifically, motive power input to the rotor 3a is converted to electric power in the stator 3b.

The ECU 8 is an electronic circuit unit including a CPU, RAM, ROM, interface circuit, and the like and controls the operation of the power transmitting device 1 by performing control processing, which is defined by a previously-installed program. In this instance, the functions implemented by the control processing of the ECU 8 include a function of controlling the operation of the electric motor 3 via the PDU 6, a function of controlling the operation of the engine 2 via an actuator for engine control such as an actuator for a throttle valve, which is not illustrated, and a function of controlling the operations of the sleeves of a first clutch C1, a second clutch C2, an auxiliary device clutch 33, a first synchronizer S1, a second synchronizer S2, and a reverse synchronizer SR described later via actuators or drive circuits, which are not illustrated.

The power transmitting device 1 includes a differential rotation mechanism 9 composed of rotating elements configured to rotate differentially with respect to one another. In this embodiment, a planetary gear unit is used as the differential rotation mechanism 9.

The output shaft 2a of the engine 2 is connected to two main input shafts, namely a first main input shaft 11 and a second main input shaft 12, which selectively receive an input of the motive power from the engine 2 and are disposed coaxially with each other. The first main input shaft 11 extends from the engine 2 side to the electric motor 3 side, and a second main input shaft 12 formed in a hollow is rotatably provided in the outside of the first main input shaft 11 on the engine 2 side. The first main input shaft 11 is connected or disconnected to or from the output shaft 2a of the engine 2 by a first clutch (a first make-and-break device) C1. The second main input shaft 12 is connected or disconnected to or from the output shaft 2a of the engine 2 by a second clutch (a second make-and-break device) C2.

The first clutch C1 is a clutch mechanism operating in such a way that the output shaft 2a of the engine 2 operates so as to be connected or disconnected to or from the first main input shaft 11 (a clutch mechanism selectively operable between the connected state and the disconnected state) under the control of the ECU 8. The second clutch C2 is a clutch mechanism operating in such a way that the output shaft 2a of the engine 2 operates so as to be connected or disconnected to or from the second main input shaft 12 under the control of the ECU 8.

Setting the first clutch C1 to the connected state enables only power transmission from the output shaft 2a to the first main input shaft 11 and disconnects power transmission from the output shaft 2a to the second main input shaft 12. Further, setting the second clutch C2 to the connected state enables only power transmission from the output shaft 2a to the second main input shaft 12 and disconnects power transmission from the output shaft 2a to the first main input shaft 11. Note that both of the first clutch C1 and the second clutch C2 are not set to the connected state, but only one of the first clutch C1 and the second clutch C2 is able to be selectively set to the connected state.

Further, these clutches C1 and C2 are preferably dry clutches. In this case, the dry clutches C1 and C2 enable a reduction in the make-and-break time and a reduction in size of the make-and-break element in comparison with the case where the clutches C1 and C2 are wet clutches. In addition, a shock caused by a change in motive power generated by engine braking or the like is able to be suppressed by controlling the electric motor 3.

A sub input shaft 13 is disposed parallel to the main input shafts 11 and 12. Moreover, the second main input shaft 12 and the sub input shaft 13 correspond to intermediate input shafts of the present invention and are always connected to each other via an idler shaft 14 disposed parallel to the first main input shaft 11 (see FIG. 2).

Specifically, a gear 12a fixed onto the second main input shaft 12 engages with a gear 14a fixed onto the idler shaft 14, by which a pair of gears 15 is formed. The motive power transmitted to the second main input shaft 12 is transmitted to the idler shaft 14 via the pair of gears 15. Further, the gear 14a engages with a gear 13a fixed onto the sub input shaft 13, by which a pair of gears 16 is formed. The motive power transmitted to the idler shaft 14 is transmitted to the sub input shaft 13 via the pair of gears 16. Both ends of the sub input shaft 13 are rotatably supported by shaft bearings, which are not illustrated. The idler shaft 14 is idle-rotatably supported relative to a fixed part such as a housing, which is not illustrated.

Further, an output shaft 17 is disposed parallel to the first main input shaft 11 and the sub input shaft 13. Both ends of the output shaft 17 are rotatably supported by shaft bearings, which are not illustrated.

On the first main input shaft 11, there is provided a first gear group, which is composed of a plurality of gears 18a and 18b selectively connected to the output shaft 17 via a first synchronizer (a synchromesh mechanism) S1.

The first synchronizer S1 is well-known, and an actuator and a shift fork, which are not illustrated, move the sleeve in the axial direction of the first main input shaft 11, thereby selectively connecting the third speed gear 18a or the fifth speed gear 18b to the first main input shaft 11. If the sleeve moves from the illustrated neutral position to the left side, the third speed gear 18a is connected to the first main input shaft 11 (hereinafter, this state is referred to as "third speed stage established state"). On the other hand, if the sleeve moves from the neutral position to the right side, the fifth speed gear 18b is connected to the first main input shaft 11 (hereinafter, this state is referred to as "fifth speed stage established state"). When the sleeve is in the neutral position, both of the third speed gear 18a and the fifth speed gear 18b are disconnected from the first main input shaft 11 (hereinafter, this state is referred to as "neutral state"). On the sub input shaft 13, there is provided a second gear group, which is composed of a plurality of gears 19a and 19b selectively connecting the sub input shaft 13 to the output shaft 17 via a second synchronizer (a synchromesh mechanism) S2.

The second synchronizer S2 is well-known, and an actuator and a shift fork, which are not illustrated, move the sleeve in the axial direction of the sub input shaft 13, thereby selectively connecting the second speed gear 19a or the fourth speed gear 19b to the sub input shaft 13. If the sleeve moves from the illustrated neutral position to the left side, the second speed gear 19a is connected to the sub input shaft 13 (hereinafter, this state is referred to as "second speed stage established state"). On the other hand, if the sleeve moves from the neutral position to the right side, the fourth speed gear 19b is connected to the sub input shaft 13 (hereinafter, this state is referred to as "fourth speed stage established state"). When the sleeve is in the neutral position, both of the second speed gear 19a and the fourth speed gear 19b are disconnected from the sub input shaft 13 (hereinafter, this state is referred to as "neutral state").

The third speed gear 18a engages with a low speed gear 17a fixed onto the output shaft 17, by which a third speed gear pair 20 is formed. Further, the fifth speed gear 18b engages with a high speed gear 17b fixed onto the output shaft 17, by which a fifth speed gear pair 21 is formed.

The second speed gear 19a engages with the low speed gear 17a fixed onto the output shaft 17, by which a second speed gear pair 22 is formed. Further, the fourth speed gear 19b engages with the high speed gear 17b fixed onto the output shaft 17, by which a fourth speed gear pair 23 is formed. In this embodiment, the low speed gear 17a and the high speed gear 17b correspond to the third gear group of the present invention.

Further, a reverse shaft 24 is disposed parallel to the first main input shaft 11. Moreover, a reverse idler shaft 25 is disposed coaxially with the reverse shaft 24. In this embodiment, the reverse idler shaft 25, which is formed in a hollow, is rotatably provided in the outside of the reverse shaft 24. Both ends of the reverse shaft 24 are rotatably supported by shaft bearings, which are not illustrated.

Moreover, the reverse shaft 24 and the reverse idler shaft 25 are connected to each other via a reverse synchronizer (a synchromesh mechanism) SR. The reverse synchronizer SR is well-known, and an actuator and a shift fork, which are not illustrated, move the sleeve in the axial direction of the reverse idler shaft 25, thereby selectively connecting the reverse gear 25a to the reverse shaft 24 (hereinafter, this state is referred to as "backward stage established state"). If the sleeve moves from the illustrated neutral position to the right side, the reverse gear 25a is connected to the reverse shaft 24. When the sleeve is in the neutral position, the reverse gear 25a is disconnected from the reverse shaft 24 (hereinafter, this state is referred to as "neutral state").

The first main input shaft 11 is connected to the reverse idler shaft 25 via a pair of reverse gears 26. The pair of reverse gears 26 is composed of a gear 11a fixed onto the first main input shaft 11 and a gear 25b fixed onto the reverse idler shaft 25, which engage with each other. Further, the reverse shaft 24 is connected to the idler shaft 14 via a pair of reverse gears 27. The pair of reverse gears 27 is composed of a gear 24a fixed onto the reverse shaft 24 and the gear 14a fixed onto the idler shaft 14, which engage with each other.

A counter shaft 28 is disposed parallel to the first main input shaft 11 and further to the output shaft 17. Moreover, the output shaft 17 is connected to the counter shaft 28 via a pair of counter gears 29 (see FIG. 2). The pair of counter gears 29 is composed of a gear 17c fixed onto the output shaft 17 and a gear 28a fixed onto the counter shaft 28, which engage with each other.

The counter shaft 28 is connected to the driving wheels 4 and 4 via a differential gear unit 30 disposed between the driving wheels 4 and 4. The differential gear unit 30 includes a gear case 30a containing side gears, which are not illustrated, connected to the driving wheels 4 and 4 via axles 31 and 31, respectively, and a gear 30b fixed to the outer periphery of the gear case 30a. Further, a gear 24b fixed onto the counter shaft 28 is engaged with the gear 30b of the differential gear unit 30.

Thereby, the counter shaft 28 is connected to the driving wheels 4 and 4 via the differential gear unit 30 so as to rotate by interlocking with the driving wheels 4 and 4. Moreover, a parking gear 17d engaging with a gear of a parking mechanism, which is not illustrated, is also fixed onto the output shaft 17. Both ends of the counter shaft 28 are rotatably supported by shaft bearings, which are not illustrated.

The differential rotation mechanism 9 is provided inside the electric motor 3. A part or all of the rotor 3a, the stator 3b, and the coil 3ba constituting the electric motor 3 are disposed so as to be superposed over the differential rotation mechanism 9 in the direction perpendicular to the direction of axis of the first main input shaft 11 (in the circumferential direction), thereby enabling a reduction in size of the power transmitting device 1 favorably.

The differential rotation mechanism 9 is composed of a differential device capable of rotating a first rotating element, a second rotating element, and a third rotating element differentially with respect to one another. The differential device constituting the differential rotation mechanism 9 is a single-pinion type planetary gear unit in this embodiment and coaxially has three rotating elements, a sun gear (the first rotating element) 9s, a ring gear (the third rotating element) 9r, and a carrier (the second rotating element) 9c, which rotatably supports a plurality of planetary gears 9p engaged with the ring gear 9r and the sun gear 9s between the sun gear 9s and the ring gear 9r. These three rotating elements 9s, 9r, and 9c are capable of transmitting motive power between each other as has been known and rotate while keeping the relationship between the rpms (rotation speeds) of the rotating elements in a certain collinear relationship.

The sun gear 9s is fixed to one end of the first main input shaft 11 on the electric motor 3 side and connected to the first main input shaft 11 so as to rotate by interlocking with the first main input shaft 11. Further, the sun gear 9s is fixed to the rotor 3a on the opposite side of the engine 2. Thereby, the sun gear 9 the first main input shaft 11, and the rotor 3a rotate by interlocking with one another.

The ring gear 9r is connected to the inside of the rotor 3a so as to rotate by interlocking with the rotor 3a of the electric motor 3. Further, the ring gear 9r is configured to be switchable between the fixed state and the unfixed state to the housing 31, which is an immovable part, by a ring gear synchronizer (a synchromesh mechanism) SL.

The ring gear synchronizer SL is well-known, and an actuator and a shift fork, which are not illustrated, move the sleeve in the rotation axis direction of the ring gear 9r, thereby selectively connecting the ring gear 9r to the housing 31. If the sleeve moves from the illustrated neutral position to the right side, the ring gear 9r is placed in the fixed state. When the sleeve is in the neutral position, the ring gear 9r is placed in the unfixed state (hereinafter, this state is referred to as "neutral state").

The carrier 9c is fixed to one end of the third speed gear 18a on the electric motor 3 side and connected to the third speed gear 18a so as to rotate by interlocking with the third speed gear 18a.

Moreover, an input shaft 5a of the auxiliary device 5 is disposed parallel to the reverse idler shaft 25. Further, the reverse idler shaft 25 is connected to the input shaft 5a of the auxiliary device 5 via a belt mechanism 32. The belt mechanism 32 is composed of a gear 25c fixed onto the reverse idler shaft 25 and a gear 5b fixed onto the input shaft 5a, which are connected to each other via a belt 32a. An auxiliary device clutch 33 is inserted relative to the input shaft 5a of the auxiliary device 5, and the gear 5b and the input shaft 5a of the auxiliary device 5 are coaxially connected to each other via the auxiliary device clutch 33.

The auxiliary device clutch 33 operates in such a way as to make or break the connection between the gear 5b and the input shaft 5a of the auxiliary device 5 under the control of the ECU 8. If the auxiliary device clutch 33 is set to the connected state, the gear 5b and the input shaft 5a of the auxiliary device 5 are connected to each other via the auxiliary device clutch 33 so as to rotate integrally with each other. Further, if the auxiliary device clutch 33 is set to the disconnected state, the connection between the gear 5b and the input shaft 5a of the auxiliary device 5 made by the auxiliary device clutch 33 is released. In this state, the power transmission from the first main input shaft 11 to the input shaft 5a of the auxiliary device 5 via the reverse idler shaft 25 is interrupted.

In this embodiment, the main operation modes of the power transmitting device 1 include an engine running mode in which the vehicle runs with only the engine 2 as a power generation source of the vehicle, an EV running mode in which the vehicle runs with only the electric motor 3 as a power generation source of the vehicle, and an HEV running mode in which the vehicle runs with both of the engine 2 and the electric motor 3 driven. The HEV running mode includes an assist running mode in which the vehicle runs with the output from the electric motor 3 added to the output from the engine 2 and a regenerative running mode in which the vehicle runs with the output from the engine 2 supplied to the electric motor 3 while the electric motor 3 performs the regenerative operation. In the regenerative running mode, the battery 7 is charged by the regenerative operation of the electric motor 3. In the EV running mode, the electric motor 3 outputs motive power by consuming the electric energy accumulated in the battery 7.

Then, in this embodiment, the ECU 8 sets requested power (requested driving force) of the vehicle by using a predetermined map or the like on the basis of an accelerator manipulated variable, a vehicle speed, or the like of the vehicle and selects each running mode and variable speed stage according to the requested power. Further, the ECU 8 controls the power transmitting device 1 according to the selected running mode, variable speed stage, or the like.

For example, the ECU 8 selects the assist running mode if the motive power output from the engine 2 when the engine 2 is operated in an appropriate operating region such as, for example, a region in which the fuel consumption is favorable (hereinafter, the motive power is referred to as "appropriate operating power") is less than the requested power. In this instance, the ECU 8 controls the battery 7 to supply the motive power to offset the shortage against the requested power. If there is a need to operate the electric motor 3 at an output or speed exceeding the rated output or the maximum rpm in order to offset the shortage, however, the electric motor 3 is operated at the rated output or the maximum rpm and the output from the engine 2 is increased.

Moreover, when the appropriate operating power exceeds the requested power, the ECU 8 selects the regenerative running mode to charge the battery 7 with differential motive power (energy) obtained by decreasing a transmission loss caused by gears or the like from the appropriate operating power. Also when the charge level (SOC) of the battery 7 is low, the ECU 8 selects the regenerative running mode in order to advance the charge of the battery 7 and increases the output from the engine 2.

Figure 2:
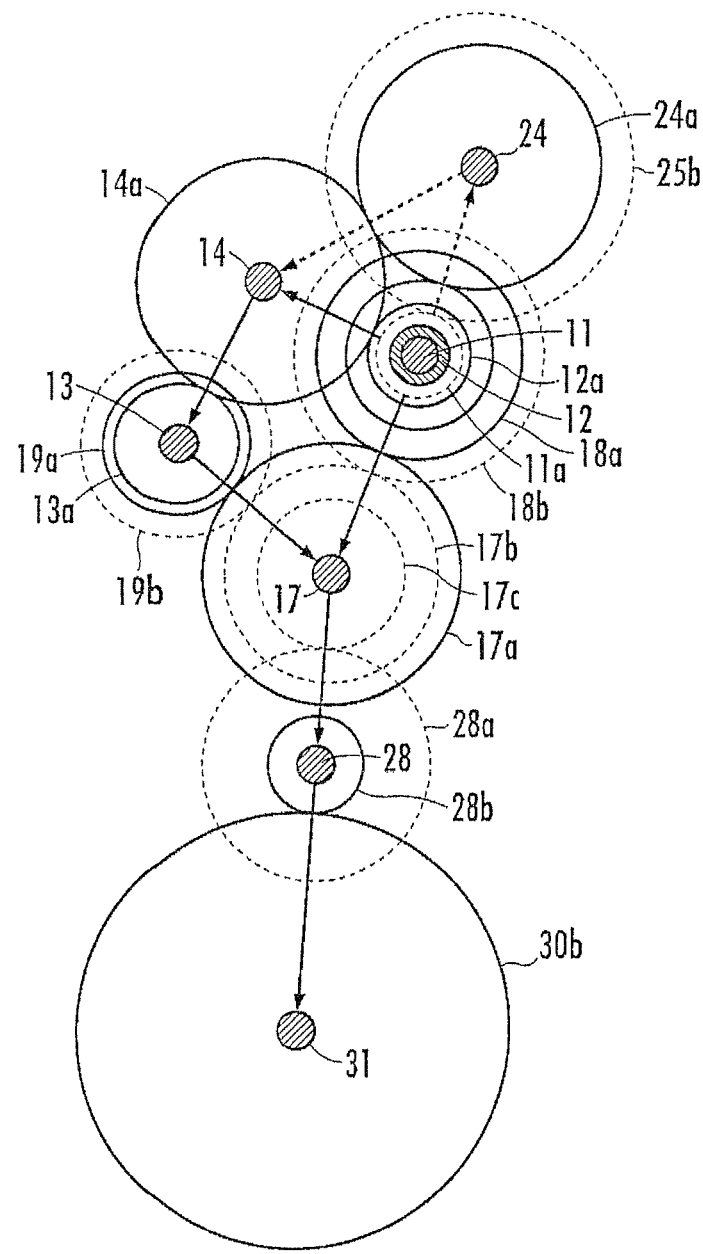
FIG. 2 is a diagram illustrating positional relationships between the shafts of the power transmitting device.

Subsequently, the variable speed stages of the power transmitting device 1 according to this embodiment will be described with reference to FIGS. 1 to 3. As described above, the power transmitting device 1 of this embodiment is configured to change the rotation speed of the input shaft in a plurality of stages via the respective gear pairs at a plurality of variable speed stages having different transmission gear ratios and then to output motive power to the output shaft 17. In other words, the power transmitting device 1 of this embodiment has a stepped transmission. The power transmitting device 1 secures variable speed stages with five forward stages and one backward stage. In the power transmitting device 1, it is defined that a higher variable speed stage has a lower transmission gear ratio.

At the engine startup, the first clutch. C1 is set to the connected state and the electric motor 3 is driven to start the engine 2. In other words, the electric motor 3 also serves as a starter.

[First Speed Stage]

A first speed stage (a pseudo first speed stage) is established by placing the ring gear 9r and the housing 31 in a connected state (a fixed state) by using the ring gear synchronizer SL and placing the first synchronizer S1, the second synchronizer S2, and the reverse synchronizer SR in the neutral state. The first speed stage corresponds to a variable speed stage having a gear ratio lower than that of a second speed stage described later. If the vehicle runs with the engine 2, the second clutch C2 is set to a disconnected state (hereinafter, referred to as "OFF state") and the first clutch C1 is set to a connected state (hereinafter, referred to as "ON state").

Figure 4:
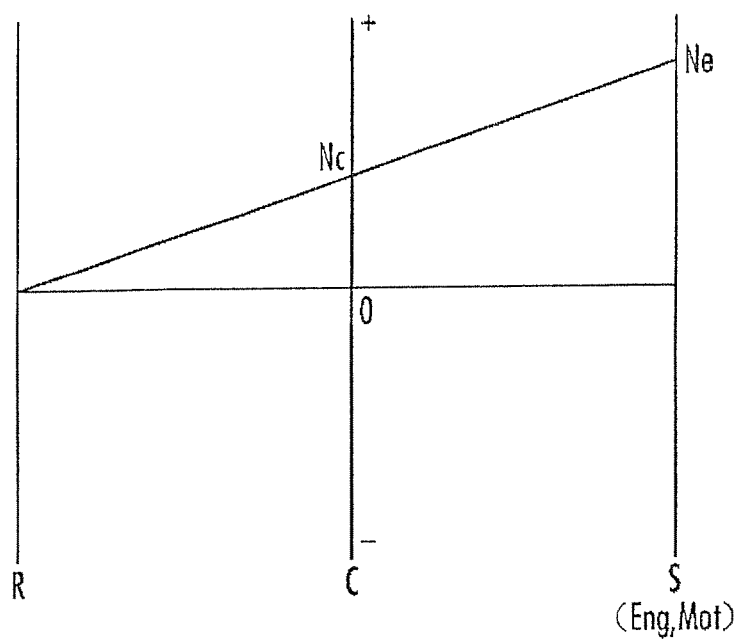
FIG. 4 is a collinear diagram for describing the working of the power combining mechanism.

Thereby, the motive power output from the engine 2 is transmitted to the sun gear 9s and the sun gear 9s is rotated in the forward direction (rpm Ne). Since the ring gear 9r is placed in the fixed state, the carrier 9c rotates in the forward direction as illustrated in FIG. 4. At this time, the rotation (rpm Nc) of the carrier 9c is decelerated relative to the rotation of the sun gear 9s due to a reaction force of the ring gear 9r. Then, the motive power output from the engine 2 is transmitted to the driving wheels 4 and 4 passing through the first main input shaft 11, the sun gear 9s, and the carrier 9c and thereafter through the third speed gear pair 20, the output shaft 17, and the like, by which the first speed stage is established. Therefore, if the power transmitting device has the same number of variable speed gear pairs as that of the transmission described in Patent Document 1, the power transmitting device has one more variable speed stage, thereby enabling a reduction in the axial length. FIG. 4 is a collinear diagram with the forward direction and the reverse direction represented by "+" and "−," respectively.

Driving the electric motor 3 in addition to the engine 2 enables assist running by the electric motor 3 at the first speed stage (running with the driving force of the engine 2 assisted by the electric motor 3). In this case, the driving force output from the electric motor 3 is transmitted to the driving wheels 4 and 4 via the sun gear 9s, the carrier 9c, the third speed gear pair 20, the output shaft 17, and the like. Further, setting the first clutch C1 to the OFF state enables the EV running in which the vehicle runs with the electric motor 3 alone.

Moreover, during a deceleration regenerative operation, it is possible to charge the battery 7 via the PDU 6 by braking the electric motor 3 to put the vehicle in a deceleration state and causing the electric motor 3 to generate electricity.

Further, if the ECU 8 determines that an upshift to the second speed stage is expected according to the running state of the vehicle during running at the first speed stage by driving the engine 2 with the first clutch C1 in the ON state and the second clutch C2 in the OFF state, the second synchronizer S2 is placed in a second speed stage established state or in a preshift state in which the second synchronizer S2 is brought close to the second speed stage established state. This achieves a state at the first speed stage in preparation for the second speed stage in which an upshift is able to be smoothly performed from the first speed stage to the second speed stage.

[Second Speed Stage]

The second speed stage is established by placing the second synchronizer S2 in the second speed stage established state and placing the first synchronizer S1, the ring gear synchronizer SL, and the reverse synchronizer SR in the neutral state. If the vehicle runs with the engine 2, the second clutch C2 is set to the ON state. In the second speed stage, the driving force output from the engine 2 is transmitted to the driving wheels 4 and 4 via the second main input shaft 12, the pair of gears 15, the idler shaft 14, the pair of gears 16, the sub input shaft 13, the second speed gear pair 22, the output shaft 17, and the like.

Moreover, if the ECU 8 determines that a downshift to the first speed stage is expected according to the running state of the vehicle during running at the second speed stage by driving the engine 2, the first synchronizer S1 is placed in a first speed stage established state or in a preshift state in which the first synchronizer S1 is brought close to the first speed stage established state. This achieves a state at the second speed stage in preparation for the first speed stage in which a downshift is able to be smoothly performed from the second speed stage to the first speed stage.

Moreover, driving the electric motor 3 in addition to the engine 2 in this state also enables assist running by the electric motor 3. In this case, the driving force output from the electric motor 3 is transmitted to the driving wheels 4 and 4 via the sun gear 9s, the third speed gear pair 20, the output shaft 17, and the like. Further, it is also possible to perform the EV running with the driving by the engine 2 stopped in this state. If the driving by the engine 2 is stopped, the engine 2 may be placed, for example, in a fuel cut state or in a cylinder-idling state. Moreover, the vehicle is able to perform the deceleration regenerative operation.

Further, if the ECU 8 determines that an upshift to the third speed stage is expected according to the running state of the vehicle during running at the second speed stage by driving the engine 2, the first synchronizer S1 is placed in a third speed stage established state or in a preshift state in which the first synchronizer S1 is brought close to the third speed stage established state. This achieves a state at the second speed stage in preparation for the third speed stage in which an upshift is able to be smoothly performed from the second speed stage to the third speed stage.

Moreover, driving the electric motor 3 in addition to the engine 2 in this state also enables assist running by the electric motor 3. In this case, the driving force output from the electric motor 3 is transmitted to the driving wheels 4 and 4 via the sun gear 9s, the third speed gear pair 20, the output shaft 17, and the like. Further, it is also possible to perform the EV running with the driving by the engine 2 stopped in this state. If the driving by the engine 2 is stopped, the engine 2 may be placed, for example, in a fuel cut state or in a cylinder-idling state. Moreover, the vehicle is able to perform the deceleration regenerative operation.

[Third Speed Stage]

The third speed stage is established by placing the first synchronizer S1 in the third speed stage established state and placing the second synchronizer S2, the ring gear synchronizer SL, and the reverse synchronizer SR in the neutral state. If the vehicle runs with the engine 2, the first clutch C1 is set to the ON state. In the third speed stage, the driving force output from the engine 2 is transmitted to the driving wheels 4 and 4 via the first main input shaft 11, the third speed gear pair 20, the output shaft 17, and the like.

Moreover, driving the electric motor 3 in addition to the engine 2 also enables assist running by the electric motor 3 at the third speed stage. In this case, the driving force output from the electric motor 3 is transmitted to the driving wheels 4 and 4 via the sun gear 9s, the third speed gear pair 20, the output shaft 17, and the like. Further, the EV running is able to be performed with the first clutch C1 in OFF state. Moreover, it is also possible to perform the EV running with the first clutch C1 in the ON state and the driving by the engine 2 stopped. In addition, the vehicle is able to perform the deceleration regenerative operation at the third speed stage.

While the vehicle is running at the third speed stage, the ECU 8 predicts whether the variable speed stage is to be changed next to the second speed stage or to the fourth speed stage on the basis of the running state of the vehicle. If the ECU 8 expects a downshift to the second speed stage, the second synchronizer S2 is placed in the second speed stage established state or in a preshift state in which the second synchronizer S2 is brought close to the second speed stage established state. This achieves a state at the third speed stage in preparation for the second speed stage in which a downshift is able to be smoothly performed from the third speed stage to the second speed stage.

Further, if the ECU 8 expects an upshift to the fourth speed stage during running at the third speed stage, the second synchronizer S2 is placed in the fourth speed stage established state or in a preshift state in which the second synchronizer S2 is brought close to the fourth speed stage established state. This achieves a state at the third speed stage in preparation for the fourth speed stage in which an upshift is able to be smoothly performed from the third speed stage to the fourth speed stage.

[Fourth Speed Stage]

The fourth speed stage is established by placing the second synchronizer S2 in the fourth speed stage established state and placing the first synchronizer S1, the ring gear synchronizer SL, and the reverse synchronizer SR in the neutral state. If the vehicle runs with the engine 2, the second clutch C2 is set to the ON state. In the fourth speed stage, the driving force output from the engine 2 is transmitted to the driving wheels 4 and 4 via the second main input shaft 12, the pair of gears 15, the idler shaft 14, the pair of gears 16, the sub input shaft 13, the fourth speed gear pair 23, the output shaft 17, and the like.

While the vehicle is running at the fourth speed stage with the engine 2 driven, the ECU 8 predicts whether the variable speed stage is to be changed next to the third speed stage or to the fifth speed stage on the basis of the running state of the vehicle. If the ECU 8 expects a downshift to the third speed stage, the first synchronizer S1 is placed in the third speed stage established state or in a preshift state in which the first synchronizer S1 is brought close to the third speed stage established state. This achieves a state at the fourth speed stage in preparation for the third speed stage in which a downshift is able to be smoothly performed from the fourth speed stage to the third speed stage.

Moreover, driving the electric motor 3 in addition to the engine 2 in this state also enables assist running by the electric motor 3. In this case, the driving force output from the electric motor 3 is transmitted to the driving wheels 4 and 4 via the sun gear 9s, the third speed gear pair 20, the output shaft 17, and the like. Further, it is also possible to perform the EV running with the driving by the engine 2 stopped in this state. If the driving by the engine 2 is stopped, the engine 2 may be placed, for example, in a fuel cut state or in a cylinder-idling state. Moreover, the vehicle is able to perform the deceleration regenerative operation.

Further, if the ECU 8 expects an upshift to the fifth speed stage during running at the fourth speed stage by driving the engine 2, the first synchronizer S1 is placed in a fifth speed stage established state or in a preshift state in which the first synchronizer S1 is brought close to the fifth speed stage established state. This achieves a state at the fourth speed stage in preparation for the fifth speed stage in which an upshift is able to be smoothly performed from the fourth speed stage to the fifth speed stage.

Moreover, driving the electric motor 3 in addition to the engine 2 in this state also enables assist running by the electric motor 3. In this case, the driving force output from the electric motor 3 is transmitted to the driving wheels 4 and 4 via the sun gear 9s, the fifth speed gear pair 21, the output shaft 17, and the like. Further, it is also possible to perform the EV running with the driving by the engine 2 stopped in this state. If the driving by the engine 2 is stopped, the engine 2 may be placed, for example, in a fuel cut state or in a cylinder-idling state. Moreover, the vehicle is able to perform the deceleration regenerative operation.

[Fifth Speed Stage]

The fifth speed stage is established by placing the first synchronizer S1 in the fifth speed stage established state and placing the second synchronizer S2, the ring gear synchronizer SL, and the reverse synchronizer SR in the neutral state. If the vehicle runs with the engine 2, the first clutch C1 is set to the ON state. In the fifth speed stage, the driving force output from the engine 2 is transmitted to the driving wheels 4 and 4 via the first main input shaft 11, the fifth speed gear pair 21, the output shaft 17, and the like.

Moreover, driving the electric motor 3 in addition to the engine 2 also enables assist running by the electric motor 3 at the fifth speed stage. In this case, the driving force output from the electric motor 3 is transmitted to the driving wheels 4 and 4 via the sun gear 9s, the fifth speed gear pair 21, the output shaft 17, and the like. Further, the EV running is also able to be performed with the first clutch C1 in the OFF state. In addition, it is possible to perform the EV running with the first clutch C1 in the ON state and the driving by the engine 2 stopped. Moreover, the vehicle is able to perform the deceleration regenerative operation at the fifth speed stage.

If the ECU 8 determines that the variable speed stage is to be changed to the fourth speed stage next on the basis of the running state of the vehicle while the vehicle is running at the fifth speed stage, the ECU 8 places the second synchronizer S2 in the fourth speed stage established state or in a preshift state in which the second synchronizer S2 is brought close to the fourth speed stage established state. This achieves a state at the fifth speed stage in preparation for the fourth speed stage in which a downshift is able to be smoothly performed from the fifth speed stage to the fourth speed stage.

[Backward Stage]

The backward stage is established by placing the reverse synchronizer SR in a state where the reverse shaft 24 is connected to the reverse gear 25a, placing the second synchronizer S2 in the second speed stage established state, and placing the first synchronizer S1 and the ring gear synchronizer SL in the neutral state. If the vehicle runs with the engine 2, the first clutch C1 is set to the ON state. In the backward stage, the driving force output from the engine 2 is transmitted to the driving wheels 4 and 4 via the first main input shaft 11, the pair of reverse gears 26, the reverse idler shaft 25, the reverse shaft 24, the pair of reverse gears 27, the idler shaft 14, the pair of gears 16, the sub input shaft 13, the second speed gear pair 22, the output shaft 17, and the like.

Moreover, driving the electric motor 3 in addition to the engine 2 also enables assist running by the electric motor 3 at the backward stage. In this case, the driving force output from the electric motor 3 is transmitted to the driving wheels 4 and 4 via the sun gear 9s, the first main input shaft 11, the pair of reverse gears 26, the reverse idler shaft 25, the reverse shaft 24, the pair of reverse gears 27, the idler shaft 14, the pair of gears 16, the sub input shaft 13, the second speed gear pair 22, the output shaft 17, and the like. Further, it is also possible to perform the EV running with the first clutch C1 in the OFF state. Moreover, the vehicle is able to perform the deceleration regenerative operation at the backward stage.

[Second Embodiment]

A power transmitting device 40 for a hybrid vehicle according to a second embodiment of the present invention will be described below with reference to accompanying drawings. The power transmitting device 40 is similar to the power transmitting device 1 according to the first embodiment and therefore only differences will be described below.

The power transmitting device 40 secures variable speed stages with seven forward stages and one backward stage, in which two forward stages of the variable speed stages are added to the power transmitting device 1.

On a first main input shaft 11A, there is provided a first gear group 18 composed of a plurality of gears 18a, 18b, and 18c selectively connected to the output shaft 17 via a first synchronizer (synchromesh mechanism) S1.

Figure 5:
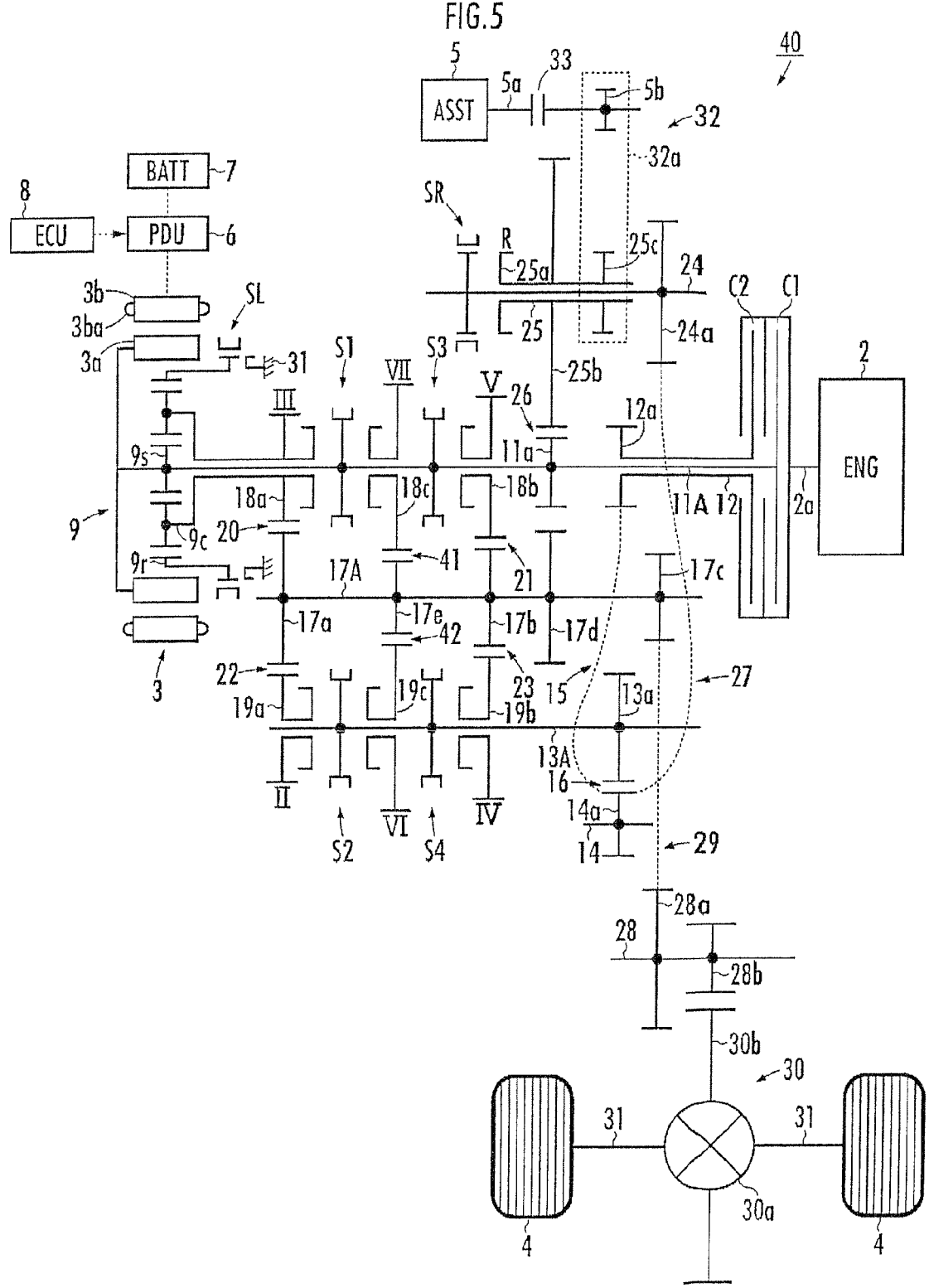
FIG. 5 is a diagram schematically illustrating the general configuration of a vehicle having a power transmitting device for a hybrid vehicle according to a second embodiment of the present invention.

Referring to FIG. 5, the first main input shaft 11A is provided thereon with the first gear group composed of a plurality of gears 18a, 18b, and 18c selectively coupled to an output shaft 17A via two synchronizers (synchromesh mechanisms), namely the first synchronizer S1 and a third synchronizer S3.

The first synchronizer S1 selectively connects the third speed gear 18a or the seventh speed gear 18c to the first main input shaft 11 by moving the sleeve in the axial direction of the first main input shaft 11A. If the sleeve moves from the illustrated neutral position to the left side, the third speed gear 18a is connected to the first main input shaft 11A. On the other hand, if the sleeve moves from the neutral position to the right side, the seventh speed gear 18c is connected to the first main input shaft 11A. When the sleeve is in the neutral position, both of the third speed gear 18a and the seventh speed gear 18c are disconnected from the first main input shaft 11A.

The third synchronizer S3 selectively connects the fifth speed gear 18b to the first main input shaft 11A by moving the sleeve in the axial direction of the first main input shaft 11A. If the sleeve moves from the illustrated neutral position to the right side, the fifth speed gear 18b is connected to the first main input shaft 11A. When the sleeve is in the neutral position, the fifth speed gear 18b is disconnected from the first main input shaft 11A.

On a sub input shaft 13A, there is provided a second gear group composed of a plurality of gears 19a, 19b, and 19c selectively connecting the sub input shaft 13A to the output shaft 17 via two synchronizers (synchromesh mechanisms), namely a second synchronizer S2 and a fourth synchronizer S4.

The second synchronizer S2 selectively connects the second speed gear 19a or the sixth speed gear 19c to the sub input shaft 13A by moving the sleeve in the axial direction of the sub input shaft 13A. If the sleeve moves from the illustrated neutral position to the left side, the second speed gear 19a is connected to the sub input shaft 13A. On the other hand, if the sleeve moves from the neutral position to the right side, the sixth speed gear 19c is connected to the sub input shaft 13A. When the sleeve is in the neutral position, both of the second speed gear 19a and the sixth speed gear 19c are disconnected from the sub input shaft 13A.

The fourth synchronizer S4 selectively connects the fourth speed gear 19b to the sub input shaft 13A by moving the sleeve in the axial direction of the sub input shaft 13A. If the sleeve moves from the illustrated neutral position to the right side, the fourth speed gear 19b is connected to the sub input shaft 13A. When the sleeve is in the neutral position, the fourth speed gear 19b is disconnected from the sub input shaft 13A.

The sub input shaft 13A is connected to the output shaft 17A via the third speed gear pair 20, the fifth speed gear pair 21, and the seventh speed gear pair 41. The seventh speed gear pair 41 is composed of the seventh speed gear 18c and a gear 17e fixed onto the output shaft 17A, which engage with each other.

The sub input shaft 13A and the output shaft 17A are connected to each other via the second speed gear pair 22, the fourth speed gear pair 23, and a sixth speed gear pair 42. The sixth speed gear pair 42 is composed of the sixth speed gear 19c and the gear 17e fixed onto the output shaft 17A, which engage with each other. In this embodiment, the low speed gear 17a, the high speed gear 17b, and the gear 17e disposed on the output shaft 17A correspond to the third gear group of the present invention.

The power transmitting device 1A having the above configuration changes the rotation speed of the input shaft in a plurality of stages via the respective gear pairs at a plurality of variable speed stages having different transmission gear ratios according to the setting states of the synchronizers S1 to S4, SR, and SL and outputs motive power to the output shaft 17A. The table in FIG. 6 shows the operating states of the respective parts in the respective variable speed stages in the engine running mode of the power transmitting device 40, though the detailed description thereof is omitted.

[Third Embodiment]

A power transmitting device 50 for a hybrid vehicle according to a third embodiment of the present invention will be described below with reference to accompanying drawings. The same reference numerals are given to the elements equivalent to those of the power transmitting device 1 according to the first embodiment and the description thereof is omitted.

Figure 7:
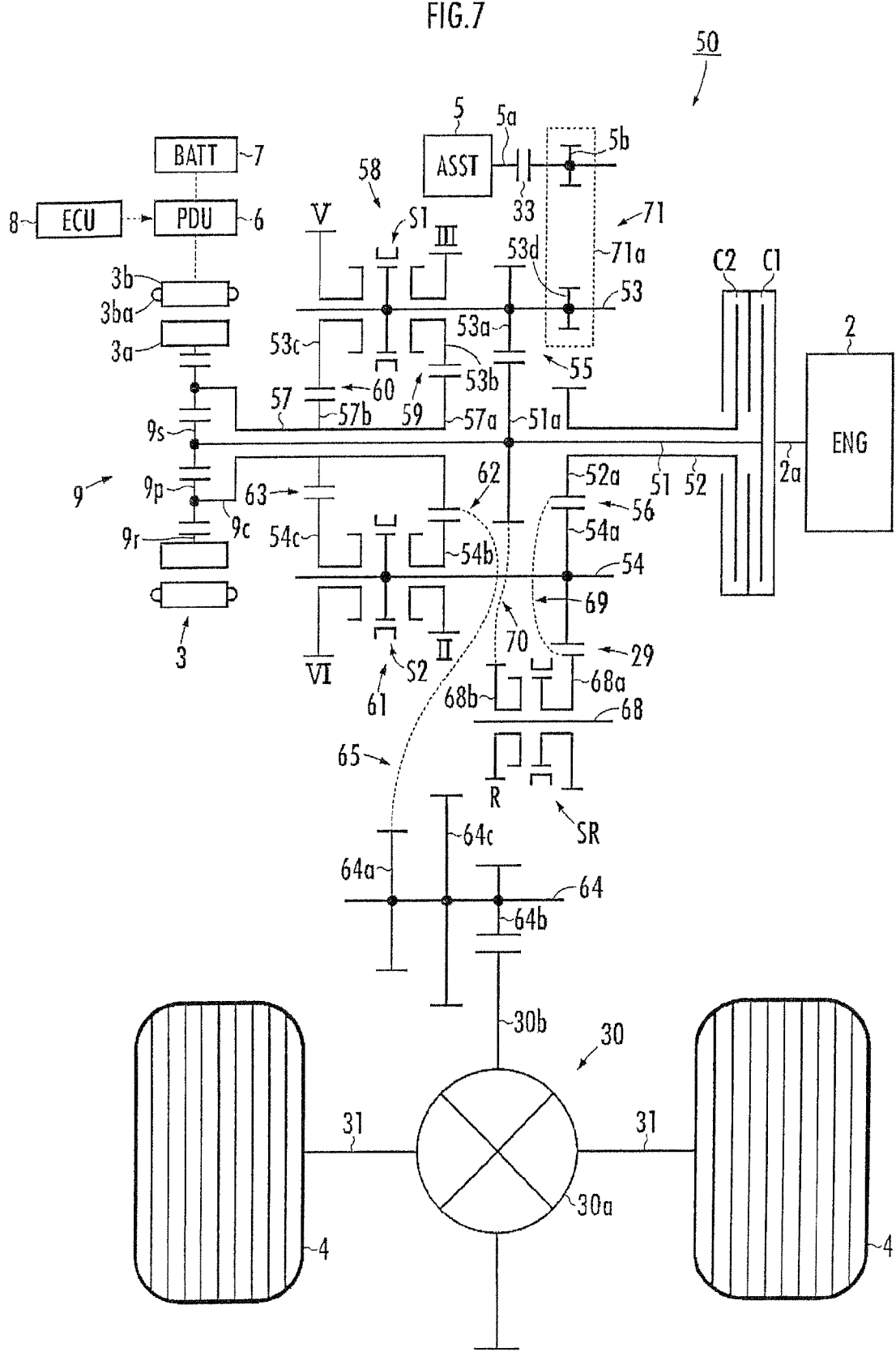
FIG. 7 is a diagram schematically illustrating the general configuration of a vehicle having a power transmitting device for a hybrid vehicle according to a third embodiment of the present invention.

Referring to FIG. 7, the output shaft 2a of the engine 2 is connected to two main input shafts, namely a first main input shaft 51 and a second main input shaft 52, to which the motive power from the engine 2 is selectively input and which are disposed coaxially with each other. The first main input shaft 51 extends from the engine 2 side to the electric motor 3 side, and a second main input shaft 52 formed in a hollow is rotatably provided in the outside of the first main input shaft 51 on the engine 2 side. The first main input shaft 51 is connected or disconnected to or from the output shaft 2a of the engine 2 by the first clutch C1. The second main input shaft 52 is connected or disconnected to or from the output shaft 2a of the engine 2 by the second clutch C2.

Two sub input shafts, namely a first sub input shaft 53 and a second sub input shaft 54 are disposed parallel to the main input shafts 51 and 52, respectively. In addition, the first main input shaft 51 and the first sub input shaft 53 are always connected to each other via a pair of reduction gears 55. The pair of reduction gears 55 is composed of a gear 51a fixed onto the first main input shaft 51 and a gear 53a fixed onto the first sub input shaft 53, which engage with each other. The pair of reduction gears 55 decelerates the motive power transmitted to the first main input shaft 51 and transmits the motive power to the first sub input shaft 53.

Further, the second main input shaft 52 and the second sub input shaft 54 are always connected to each other via a pair of speed increasing gears 56. The pair of speed increasing gears 56 is composed of a gear 52a fixed onto the second main input shaft 52 and a gear 54a fixed onto the second sub input shaft 54, which engage with each other. The pair of speed increasing gears 56 accelerates the motive power transmitted to the second main input shaft 52 and transmits the motive power to the second sub input shaft 54. Both ends of the first sub input shaft 53 and those of the second sub input shaft 54 are rotatably supported by shaft bearings, which are not illustrated.

The first clutch C1 is a clutch mechanism operating in such a way that the output shaft 2a of the engine 2 operates so as to be connected or disconnected to or from the first sub input shaft 53 via the first main input shaft 51 and the pair of reduction gears 55 under the control of the ECU 8. The second clutch. C2 is a clutch mechanism operating in such a way that the output shaft 2a of the engine 2 operates so as to be connected or disconnected to or from the second sub input shaft 54 via the second main input shaft 52 and the pair of speed increasing gears 56 under the control of the ECU 8.

If the first clutch C1 is set to the connected state, the first sub input shaft 53 is connected to the output shaft 2a via the first main input shaft 51 and the pair of reduction gears 55. In this state, only power transmission from the output shaft 2a to the first sub input shaft 53 is possible, and power transmission from the output shaft 2a to the second sub input shaft 54 is interrupted. Moreover, if the second clutch C2 is set to the connected state, the second sub input shaft 54 is connected to the output shaft 2a via the second main input shaft 52 and the pair of speed increasing gears 56. In this state, only power transmission from the output shaft 2a to the second sub input shaft 54 is possible, and power transmission from the output shaft 2a to the first sub input shaft 53 is interrupted.

Further, these clutches C1 and C2 are preferably dry clutches. In this case, the dry clutches C1 and C2 enable a reduction in the make-and-break time and a reduction in size of the make-and-break element in comparison with the case where the clutches C1 and C2 are wet clutches. In addition, a shock caused by a change in motive power generated by engine braking or the like is able to be suppressed by controlling the electric motor 3.

An output shaft 57 is disposed coaxially with the main input shafts 51 and 52. In this embodiment, the output shaft 57 formed in a hollow is rotatably provided in the outside of the first main input shaft 51 on the electric motor 3 side. In addition, the output shaft 57 and the first sub input shaft 53 are connected to each other via an odd-numbered speed gear train 58. The odd-numbered speed gear train 58 is composed of a third speed gear pair 59, in which the first gear 57a fixed onto the output shaft 57 engages with the third speed gear 53b rotatably provided on the first sub input shaft 53, and a fifth speed gear pair 60, in which the second gear 57b fixed onto the output shaft 57 engages with the fifth speed gear 53*c* rotatably provided on the first sub input shaft 53.

Further, the output shaft 57 and the second sub input shaft 54 are connected to each other via an even-numbered speed gear train 61. The even-numbered speed gear train 61 is composed of a second speed gear pair 62, in which the first gear 57*a* fixed onto the output shaft 57 engages with the second speed gear 54*b* rotatably provided on the second sub input shaft 54, and a fourth speed gear pair 63, in which the second gear 57*b* fixed onto the output shaft 57 engages with the fourth speed gear 54*c* rotatably provided on the second sub input shaft 54.

In this embodiment, the third speed gear 53*b* disposed on the first sub input shaft 53 and the fifth speed gear 53*c* correspond to the first gear group of the present invention, the second speed gear 54*b* and the fourth speed gear 54*c* disposed on the second sub input shaft 54 correspond to the second gear group of the present invention, and the first gear 57*a* and the second gear 57*b* disposed on the output shaft 57 correspond to the third gear group of the present invention. In addition, the second main input shaft 52 and the output shaft 57 fitted over the first main input shaft 51 are rotatably supported by shaft bearings, which are not illustrated.

The first sub input shaft 53 is provided with a first synchronizer S1, which is able to switch between the connection and disconnection of the third speed gear 53*b* or the fifth speed gear 53*c* and the first sub input shaft 53. The first synchronizer S1 selectively connects the third speed gear 53*b* or the fifth speed gear 53*c* to the first sub input shaft 53 by moving the sleeve in the axial direction of the first sub input shaft 53. If the sleeve moves to the right side in the diagram, the third speed gear 53*b* and the first sub input shaft 53 are connected to each other and the first sub input shaft 53 is connected to the output shaft 57 by the third speed gear pair 59, by which a third speed stage is established. On the other hand, if the sleeve moves to the left side in the diagram, the fifth speed gear 53*c* and the first sub input shaft 53 are connected to each other and the first sub input shaft 53 is connected to the output shaft 57 by the fifth speed gear pair 60, by which a fifth speed stage is established. When the sleeve is in the neutral position in the diagram, both of the third speed gear 53*b* and the fifth speed gear 53*c* are disconnected from the first sub input shaft 53.

The second sub input shaft 54 is provided with a second synchronizer S2, which is able to switch between the connection and disconnection of the second speed gear 54*b* or the fourth speed gear 54*c* and the second sub input shaft 54. The second synchronizer S2 selectively connects the second speed gear 54*b* or the fourth speed gear 54*c* to the second sub input shaft 54 by moving the sleeve in the axial direction of the second sub input shaft 54. If the sleeve moves to the right side in the diagram, the second speed gear 54*b* and the second sub input shaft 54 are connected to each other and the second sub input shaft 54 is connected to the output shaft 57 by the second speed gear pair 62, by which a second speed stage is established. On the other hand, if the sleeve moves to the left side in the diagram, the fourth speed gear 54*c* and the second sub input shaft 54 are connected to each other and the second sub input shaft 54 is connected to the output shaft 57 by the fourth speed gear pair 63, by which a fourth speed stage is established. When the sleeve is in the neutral position in the diagram, both of the second speed gear 54*b* and the fourth speed gear 54*c* are disconnected from the second sub input shaft 54.

The sun gear 9*s* of the differential rotation mechanism 9 is fixed to one end of the first main input shaft 51 on the electric motor 3 side and connected to the first main input shaft 51 so as to rotate by interlocking with the first main input shaft 51. The first main input shaft 51 is connected to the first sub input shaft 53 via the pair of reduction gears 55 and therefore the sun gear 9*s* is always connected to the first sub input shaft 53 via the first main input shaft 51 and the pair of reduction gears 55.

The ring gear 9*r* is connected to the inside of the rotor 3*a* so as to rotate by interlocking with the rotor 3*a* of the electric motor 3.

The carrier 9*c* is fixed to one end of the output shaft 57 on the electric motor 3 side and connected to the output shaft 57 so as to rotate by interlocking with the output shaft 57.

Note that although the second sub input shaft 54 is connected to the second main input shaft 52 via the pair of speed increasing gears 56, the second main input shaft 52 is connected to none of the rotating elements 9*s*, 9*r*, and 9*c* of the differential rotation mechanism 9. Therefore, the second sub input shaft 54 is able to transmit the motive power to the output shaft 57 without passing through the differential rotation mechanism 9.

Figure 8:
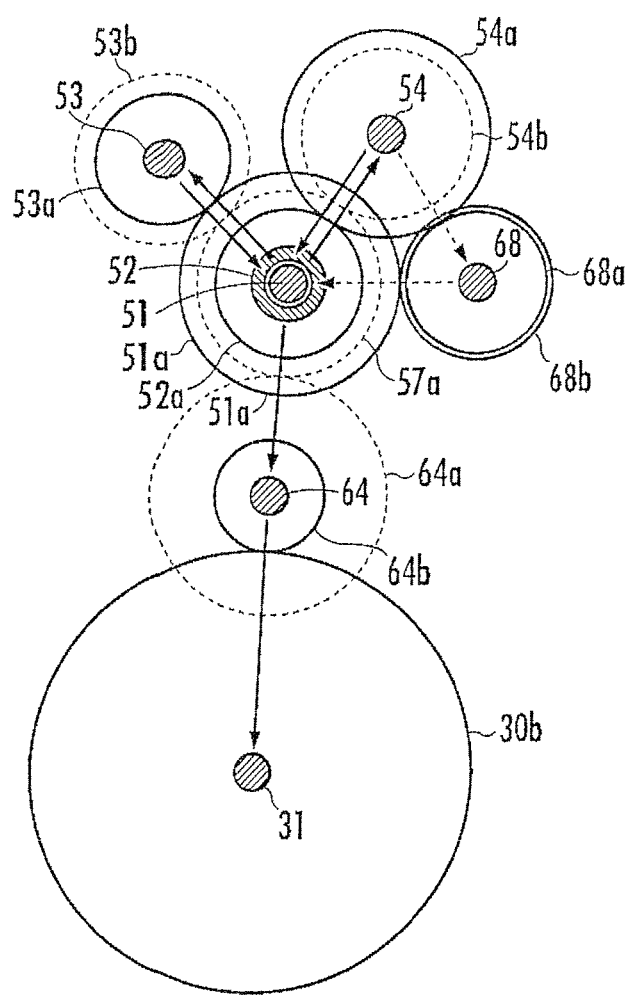
FIG. 8 is a diagram illustrating positional relationships between the shafts of the power transmitting device.
Figure 9:
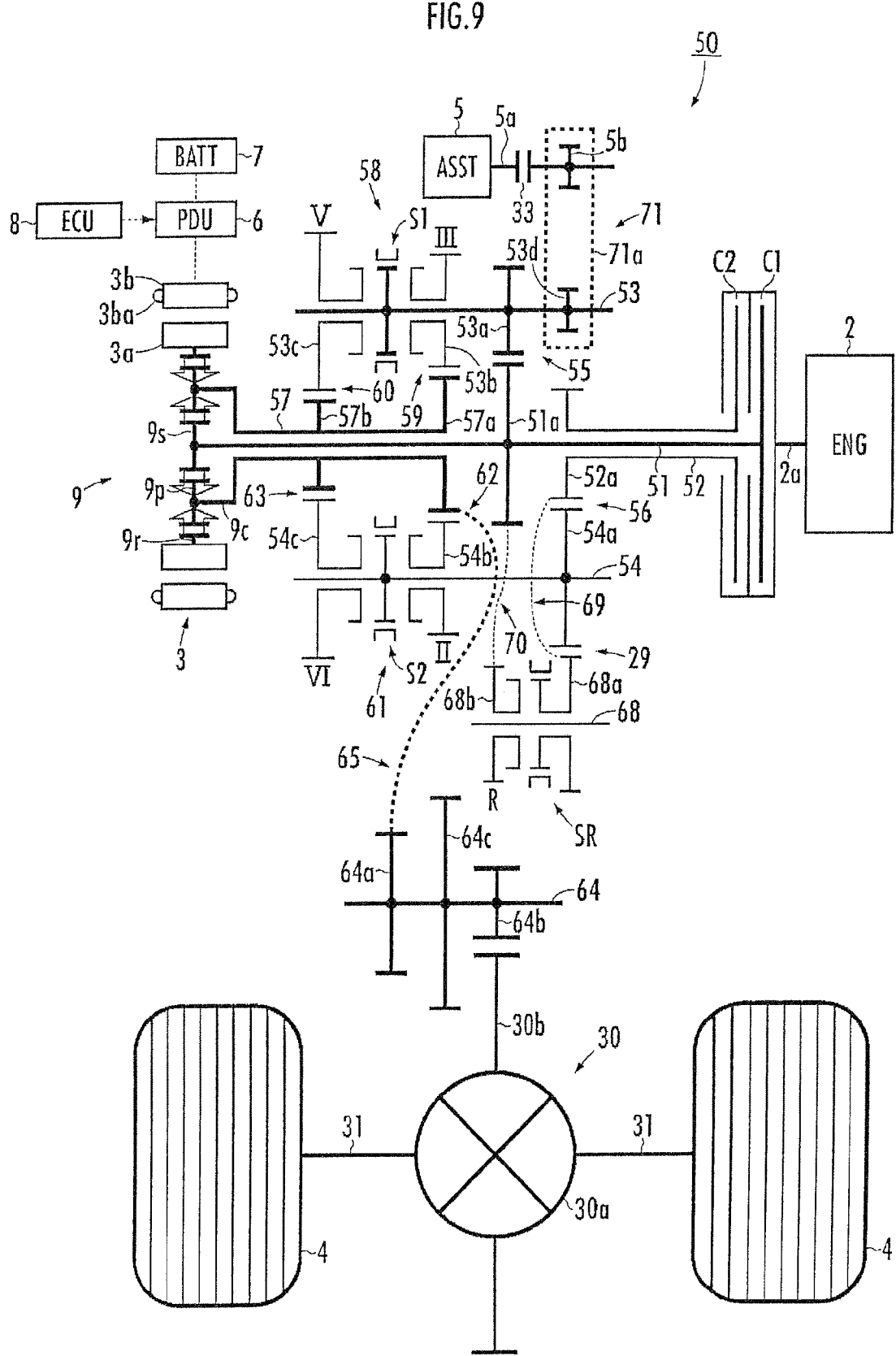
FIG. 9 is a diagram illustrating the operating state at a first speed stage of the power transmitting device.

A counter shaft 64 is disposed parallel to the first main input shaft 51 and further to the output shaft 57. In addition, the output shaft 57 and the counter shaft 64 are connected to each other via a pair of counter gears 65 (see FIG. 8). The pair of counter gears 65 is composed of a first gear 57*a* fixed onto the output shaft 57 and a gear 64*a* fixed onto the counter shaft 64, which engage with each other.

The counter shaft 64 is connected to the driving wheels 4 and 4 via a differential gear unit 30 between the driving wheels 4 and 4. A gear 64*b* fixed onto the counter shaft 64 is engaged with a gear 30*b* of the differential gear unit 30. Thereby, the counter shaft 64 is connected to the driving wheels 4 and 4 via the differential gear unit 30 so as to rotate by interlocking with the driving wheels 4 and 4. In addition, a parking gear 64*c* engaging with a gear of a parking mechanism, which is not illustrated, is also fixed onto the counter shaft 64. Both ends of the counter shaft 64 are rotatably supported by shaft bearings, which are not illustrated.

A reverse shaft 68 is disposed parallel to the first main input shaft 51 and further to the second main input shaft 52. Further, the second main input shaft 52 and the reverse shaft 68 are connected to each other via a pair of reverse gears 69 (see FIG. 8). The pair of reverse gears 69 is composed of the gear 54*a* fixed onto the second main input shaft 52 and a gear 68*a* rotatably provide on the reverse shaft 68, which engage with each other. Both ends of the reverse shaft 68 are rotatably supported by shaft bearings, which are not illustrated.

The reverse shaft 68 is provided with a reverse synchronizer SR capable of switching between the connection and disconnection of the gear 68*a* and a gear 68*b* rotatably provided on the reverse shaft 68. The gear 68*b* engages with the gear 51*a* fixed onto the first main input shaft 51, thereby constituting a pair of reverse gears 70.

The reverse synchronizer SR is well-known and performs the connection and disconnection between the gear 68*a* and the gear 68*b* by moving the sleeve in the axial direction of the reverse shaft 68 by using an actuator and a shift fork, which are not illustrated. If the sleeve is in the position illustrated in the diagram, the gear 68*a* is disconnected from the gear 68*b*. If the sleeve moves to the left side in the diagram, the gear 68*a* is connected to the gear 68*b* and the first main input shaft 51 is connected to the second sub input shaft 54 via the pairs of reverse gears 69 and 70.

When the gear 68*a* is connected to the gear 68*b* by the reverse synchronizer SR, the rotation of the second main input shaft 52, which rotates in the direction in which the output shaft 2*a* rotates at the time of driving the engine 2

(hereinafter, the direction is referred to as "forward direction") (hereinafter, referred to as "rotate in the forward direction"), is reversed and is transmitted to the first main input shaft 51 and the first main input shaft 51 rotates in the direction opposite to the forward direction (hereinafter, the opposite direction is referred to as "reverse direction") (hereinafter, referred to as "rotate in the reverse direction").

When the gear 68a is connected to the gear 68b by the reverse synchronizer SR, the axles 31 and 31 rotate in the reverse direction in the case where the output shaft 2a of the engine 2 rotates in the forward direction, and the driving wheels 4 and 4 rotate in the direction of causing the vehicle to move backward. On the other hand, when the gear 68a is disconnected from the gear 68b, the axles 31 and 31 rotate in the forward direction in the case where the output shaft 2a of the engine 2 rotates in the forward direction, and the driving wheels 4 and 4 rotate in the direction of causing the vehicle to move forward.

Further, an input shaft 5a of the auxiliary device 5 is disposed parallel to the first sub input shaft 53. In addition, the first sub input shaft 53 and the input shaft 5a of the auxiliary device 5 are connected to each other via a belt mechanism 71. The belt mechanism 71 is composed of a gear 53d fixed onto the first sub input shaft 53 and a gear 5b fixed onto the input shaft 5a, which are connected to each other via a belt 71a. The input shaft 5a of the auxiliary device 5 has an auxiliary device clutch 33 interposed thereon, and the gear 5b is coaxially connected to the input shaft 5a of the auxiliary device 5 via the auxiliary device clutch 33.

In the power transmitting device 50 having the above configuration, the motive power output from the output shaft 2a of the engine 2 is transmitted to the driving wheels 4 and 4 through a first power transmission path from the first main input shaft 51 to the output shaft 57 via the pair of reduction gears 55 and the first sub input shaft 53 or through a second power transmission path from the second main input shaft 52 to the output shaft 57 via the pair of speed increasing gears 56 and the second sub input shaft 54.

Moreover, the motive power output from the output shaft 2a of the engine 2 is transmitted from the first main input shaft 51 to the sun gear 9s or/and to the carrier 9c via the output shaft 57 and then input to the differential rotation mechanism 9. The motive power output from the electric motor 3 is transmitted to the ring gear 9r and then input to the differential rotation mechanism 9. Thereafter, the differential rotation mechanism 9 combines the input motive powers, and the combined motive power is transmitted to the driving wheels 4 and 4 via the output shaft 57 to assist the motive power transmitted from the engine 2 to the output shaft 57 without passing through the differential rotation mechanism 9. When the ring gear 9r rotates in the reverse direction, the electric motor 3 performs the regenerative operation.

Subsequently, the operation of the power transmitting device 50 according to this embodiment will be described. The power transmitting device 50 has a wide variety of operation modes. FIGS. 9 and 11 to FIG. 25 visually illustrate the operating states of the power transmitting device 50 in the various operation modes. In these diagrams, the first clutch C1, the second clutch C2, and the auxiliary device clutch 33 are each represented by a thick line in the case where the operating state of each of the first clutch C1, the second clutch C2, and the auxiliary device clutch 33 is the connected state (hereinafter, referred to as "ON state"), while the clutches C1, C2, and 33 are each represented by a normal solid line in the case where the operating state is the disconnected state (hereinafter, referred to as "OFF state"). Moreover, in the respective operation modes, the constituents of the power transmitting device 50, which rotate with being connected to other constituents, are represented by thick lines.

In this embodiment, the main operation modes of the power transmitting device 50 include an engine running mode in which the vehicle runs with only the engine 2 as a power generation source of the vehicle, an EV running mode in which the vehicle runs with only the electric motor 3 as a power generation source of the vehicle, and an HEV running mode in which the vehicle runs with both of the engine 2 and the electric motor 3 driven. The HEV running mode includes an assist running mode (combined running mode) in which the vehicle runs with the output from the electric motor 3 added to the output from the engine 2 and a regenerative running mode in which the vehicle runs with the output from the engine 2 supplied to the electric motor 3 while the electric motor 3 performs the regenerative operation. In the regenerative running mode, the battery 7 is charged by the regenerative operation of the electric motor 3. In the EV running mode, the electric motor 3 outputs motive power by consuming the electric energy accumulated in the battery 7.

Further, in this embodiment, the ECU 8 sets requested power (requested driving force) of the vehicle by using a predetermined map or the like on the basis of an accelerator manipulated variable, a vehicle speed, or the like of the vehicle and selects each running mode or variable speed stage according to the requested power. Further, the ECU 8 controls the power transmitting device 1 according to the selected running mode, variable speed stage, or the like.

For example, the ECU 8 selects the assist running mode when the motive power output from the engine 2 and input to the differential rotation mechanism 9 (hereinafter, referred to as "appropriate operating power") is less than the requested power when the engine 2 is operated in an appropriate operating region such as, for example, a region in which the fuel consumption is favorable. In this instance, the ECU 8 controls the battery 7 to supply the motive power to offset the shortage against the requested power. If there is a need to operate the electric motor 3 at an output or speed exceeding the rated output or the maximum rpm in order to offset the shortage, however, the electric motor 3 is operated at the rated output or the maximum rpm and the output from the engine 2 is increased.

Moreover, when the appropriate operating power exceeds the requested power, the ECU 8 selects the regenerative running mode to charge the battery 7 with differential motive power (energy) obtained by decreasing a transmission loss caused by gears or the like from the appropriate operating power. Also when the charge level (SOC) of the battery 7 is low, the ECU 8 selects the regenerative running mode in order to advance the charge of the battery 7 and increases the output from the engine 2.

[Startup at First Speed Stage, Running]

Figure 10:
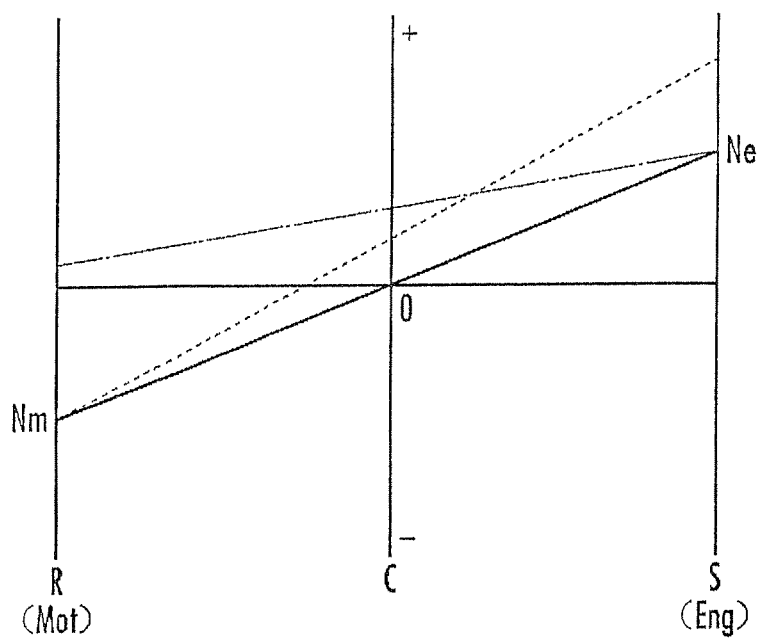
FIG. 10 is a collinear diagram for describing the working of the power combining mechanism.

FIG. 10 illustrates an operating state of a power transmitting device 50 at a first speed stage (a pseudo first speed stage). The first speed stage is a variable speed stage having a gear ratio lower than that of a second speed stage described later. In the advancing state of the first speed stage, the ECU 8 sets the first clutch C1 to the ON state and sets (activates or maintains) the first synchronizer S1, the second synchronizer S2, and the reverse synchronizer SR to the neutral state.

Thereby, the motive power (rpm Ne) from the output shaft 2a of the engine 2 is transmitted to the sun gear 9s via the first clutch C1 and the first main input shaft 51, but motive power is not transmitted from the first sub input shaft 53 and the second sub input shaft 54 to the output shaft 57. At this time, the output shaft 57 is connected to the axles 31 and 31 via the counter shaft 64. Therefore, if the driving wheels 4 and 4 remain stationary, the frictional resistances thereof inhibit the carrier 9c from rotating even if the carrier 9c begins to rotate by the forward rotation of the sun gear 9s. Therefore, as indicated by the solid line in FIG. 10, the ring gear 9r rotates in the reverse direction at rpm Nr and the electric motor 3 performs the regenerative operation to charge the battery 7.

In this manner, the electric motor 3 performs the regenerative operation when the engine 2 is in an idling state and runs idle, which enables the battery 7 to be charged with the motive power output from the engine 2 as electric energy, which leads to energy saving. Further, although conventionally a clutch has been provided with a sliding mechanism to absorb the motive power generated by the engine 2, the present invention eliminates the need to provide the sliding mechanism in the first clutch C1 and the second clutch C2, thereby enabling a reduction in size of the clutches C1 and C2. FIG. 10 is a collinear diagram with the forward direction indicated by "+" and the reverse direction indicated by "−."

In this state, the ECU 8 causes the battery 7 to supply electric power to the stator 3b of the electric motor 3 to rotate the rotating magnetic field generated in the stator 3b in the forward direction. This transmits a torque acting so as to rotate the rotor 3a in the forward direction from the stator 3b, by which the motive power acts in a direction that causes the ring gear 9r to rotate in the forward direction. Then, the planetary gear 9p rotates in the forward direction by means of the motive power for the engine 2 to rotate the sun gear 9s in the forward direction and the motive power for the electric motor 3 to rotate the ring gear 9r in the forward direction, and as indicated by the long dashed short dashed line in FIG. 10, the carrier 9c rotates in the forward direction against the frictional resistances. By interlocking with the forward rotation of the carrier 9c, the output shaft 57 rotates in the forward direction and thereby the axles 31 and 31 rotate in the forward direction. Thereby, the driving wheels 4 and 4 rotate in the advancing direction of the vehicle in the advancing state at the first speed stage in which the motive power of the engine 2 is combined with the motive power of the electric motor 3. In this manner, the power transmitting device 50 is able to start and run the vehicle at the first speed stage in the assist running mode.

On the other hand, if the motive power (the rpm Ne) from the output shaft 2a of the engine 2 increases from the above state, the carrier 9c rotates in the forward direction against the frictional resistances with the ring gear 9r rotating in the reverse direction as indicated by the dotted line in FIG. 10. The output shaft 57 rotates in the forward direction by interlocking with the forward rotation of the carrier 9c and the axles 31 and 31 rotate in the forward direction. At this time, the ring gear 9r rotates in the reverse direction and therefore the electric motor 2 is in the regenerative operation state, by which the battery 7 is charged. Thereby, the electric motor 3 performs the regenerative operation, while the driving wheels 4 and 4 rotate in the advancing direction of the vehicle in the advancing state at the first speed stage only with the motive power of the engine 2. In this manner, the power transmitting device 50 is able to start and run the vehicle at the first speed stage in the regenerative running mode.

Therefore, the power transmitting device 50 is able to start and run the vehicle at the first speed stage in different running modes, namely the assist running mode and the regenerative running mode. As a result, the power transmitting device 50 is able to use the running mode at the startup properly according to the requested power, the charge level of the battery 7, or the like. Along with the sun gear 9s, the first main input shaft 51 rotates in the forward direction and the motive power is transmitted to the input shaft 5a of the auxiliary device 5 via the pair of reduction gears 55, the first sub input shaft 53, the belt mechanism 71, and the auxiliary device clutch 33.

In this manner, the power transmitting device is able to be started and run with the first synchronizer S1 and the second synchronizer S2 placed in the neutral state. Therefore, if the power transmitting device has the same number of variable speed gear pairs as that of the transmission described in Patent Document 1, the power transmitting device has one more variable speed stage, thereby enabling a reduction in the axial length.

[Reverse Startup, Running]

Figure 11:
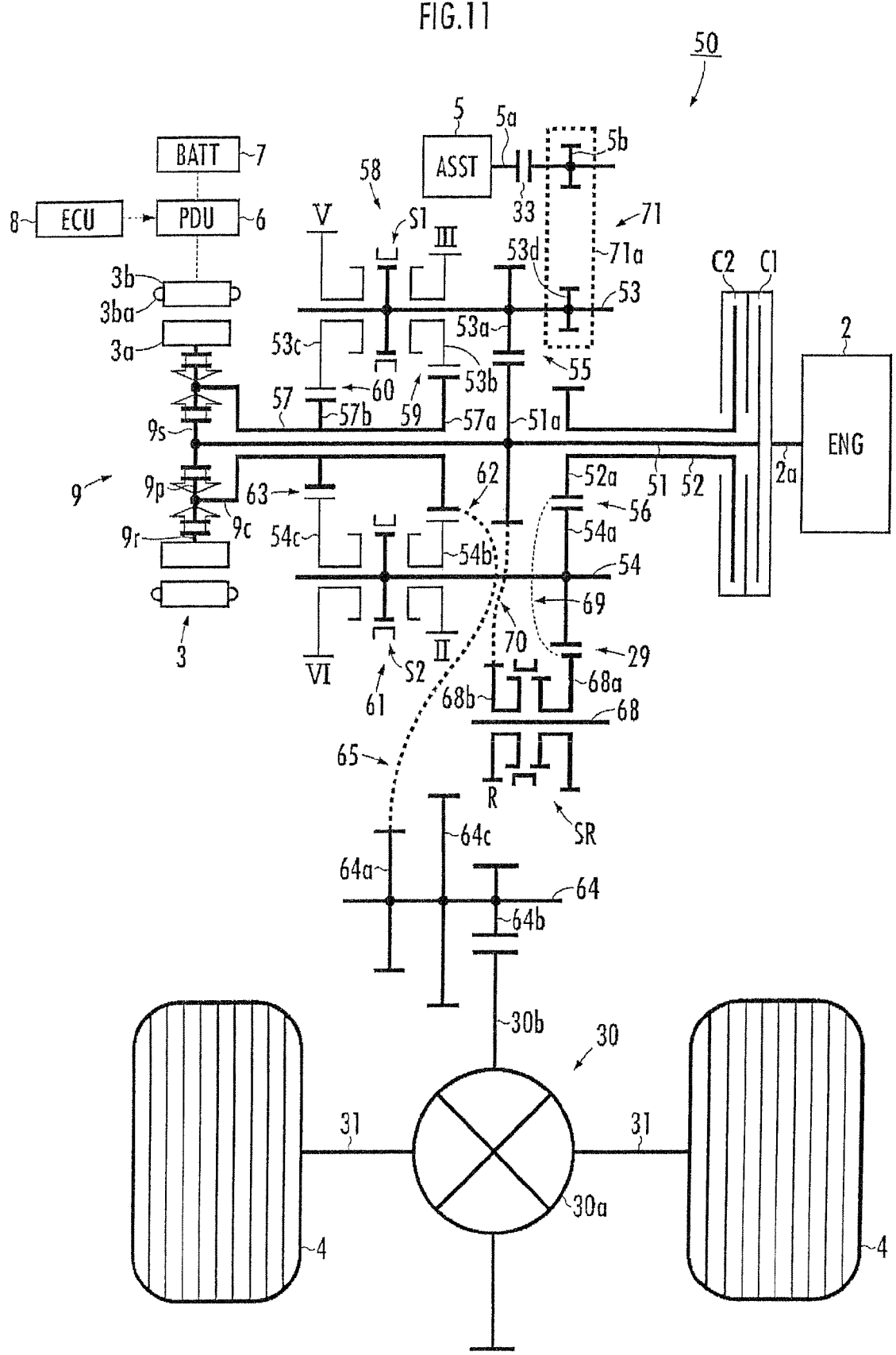
FIG. 11 is a diagram illustrating the operating state at a backward stage of the power transmitting device.

FIG. 11 illustrates the operating state of the power transmitting device 50 at the backward stage. In the advancing state at the backward stage, the ECU 8 sets the second clutch C2 to the ON state, the first synchronizer S1 and the second synchronizer S2 to the neutral state, and the reverse synchronizer SR to the reverse stage established state.

Thereby, the motive power from the output shaft 2a of the engine 2 is transmitted to the first main input shaft 51 via the second clutch C2, the second main input shaft 52, the pair of speed increasing gears 56, the second sub input shaft 54, and the pairs of reverse gears 69 and 70, and the first main input shaft 51 rotates in the reverse direction. Further, in the same manner as in the startup at the first speed stage and running, the ECU 8 controls the battery 7 to supply electric power to the stator 3b of the electric motor 3 to rotate the rotating magnetic field generated in the stator 3b in the reverse direction. Thereby, the planetary gear 9p rotates in the reverse direction and thus the carrier 9c rotates in the reverse direction by the motive power for the engine 2 to rotate the sun gear 9s in the reverse direction and the motive power for the electric motor 3 to rotate the ring gear 9r in the reverse direction. Further, by interlocking with this, the axles 31 and 31 rotate in the reverse direction, and the driving wheels 4 and 4 rotate in the backward direction of the vehicle with the motive power of the engine 2 combined with the motive power of the electric motor 3. In this manner, the power transmitting device 50 is able to move the vehicle in the backward direction in the assist running mode.

On the other hand, if the motive power from the output shaft 2a of the engine 2 is increased, the carrier 9c rotates in the reverse direction while the ring gear 9r rotates in the forward direction. By interlocking with the reverse rotation of the carrier 9c, the axles 31 and 31 rotate in the reverse direction. At this time, the ring gear 9r rotates in the forward direction and therefore the electric motor 3 performs the regenerative operation and the battery 7 is charged. Thereby, while the electric motor 3 performs the regenerative operation, the driving wheels 4 and 4 rotate in the backward direction of the vehicle only with the motive power of the engine 2. In this manner, the power transmitting device 50 is able to move the vehicle backward in the regenerative running mode.

Therefore, the power transmitting device 50 is able to move the vehicle backward in different running modes, namely the assist running mode and the regenerative running mode. As a result, the power transmitting device 50 is able to use the running mode at the backward traveling properly according to the requested power, the charge level of the battery 7, or the like.

[Engine Running Mode, Second Speed Stage]

Figure 12:
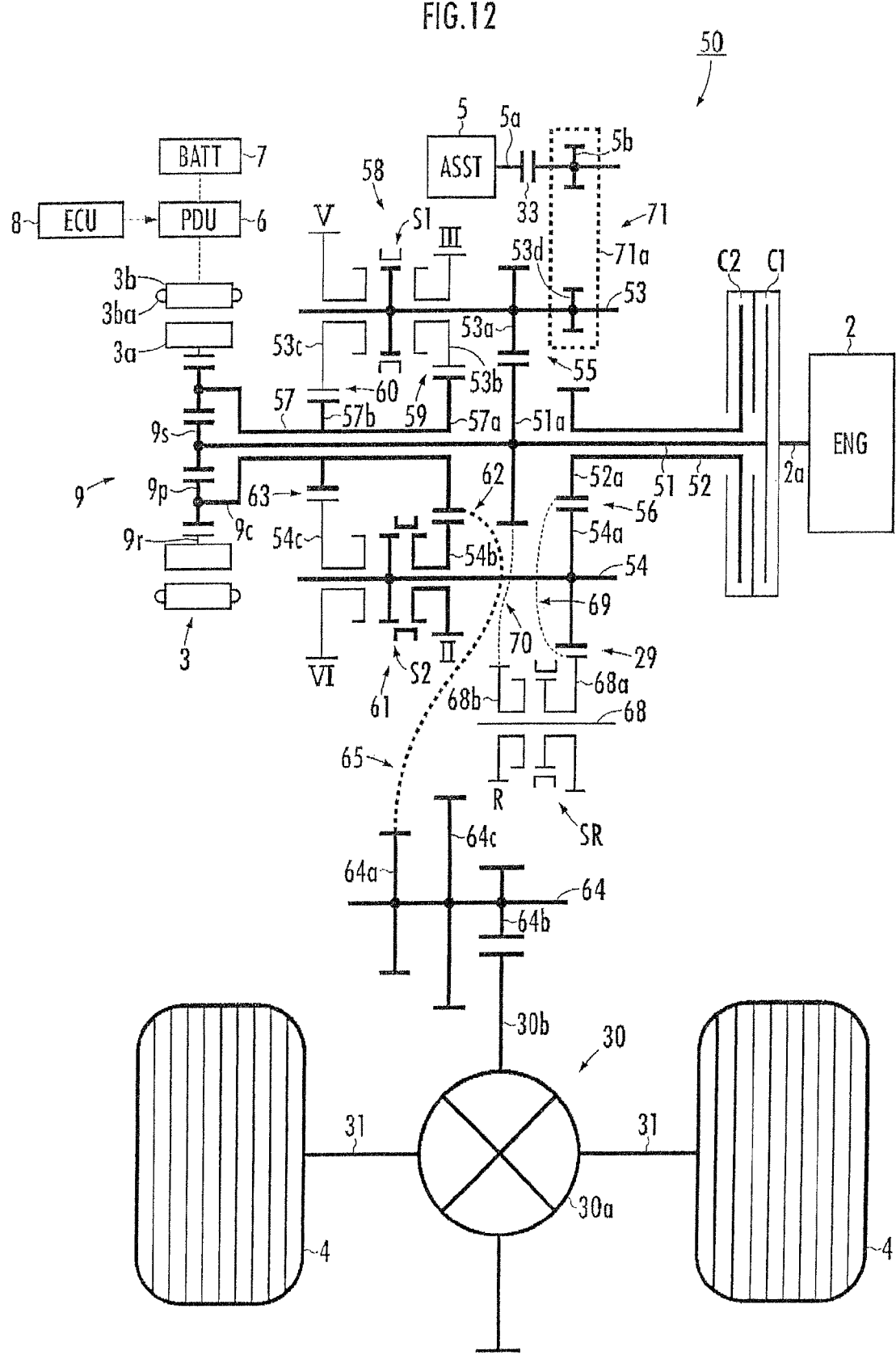
FIG. 12 is a diagram illustrating the operating state at a second speed stage in the engine running mode of the power transmitting device.

FIG. 12 illustrates the operating state of the power transmitting device 50 at the second speed stage in the engine running mode. At the second speed stage in the engine running mode, the ECU 8 sets the second clutch C2 to the ON state, the first synchronizer S1 and the reverse synchronizer SR to the neutral state, and the second synchronizer S2 to the second speed stage established state.

Thereby, the motive power from the output shaft 2a of the engine 2 is transmitted to the driving wheels 4 and 4 via the second clutch C2, the second main input shaft 52, the pair of speed increasing gears 56, the second sub input shaft 54, the second speed gear pair 62, the output shaft 57, the pair of counter gears 65, the counter shaft 64, the differential gear unit 30, and the axles 31 and 31. At this time, the carrier 9c rotates in the forward direction along with the output shaft 57, but the sun gear 9s and the ring gear 9r do not receive the motive power. Therefore, the sun gear 9s corotates with the planetary gear 9p and thus rotates in the forward direction, the ring gear 9r does not rotate, and the electric motor 3 performs none of the power operation and the regenerative operation. Thereby, the driving wheels 4 and 4 rotate in the advancing direction of the vehicle in the advancing state at the second speed stage only with the motive power of the engine 2. In addition, the first main input shaft 51 rotates in the forward direction along with the sun gear 9s, and the motive power is transmitted to the input shaft 5a of the auxiliary device 5 via the pair of reduction gears 55, the first sub input shaft 53, the belt mechanism 71, and the auxiliary device clutch 33.

[HEV Running Mode, Second Speed Stage]

Figure 13:
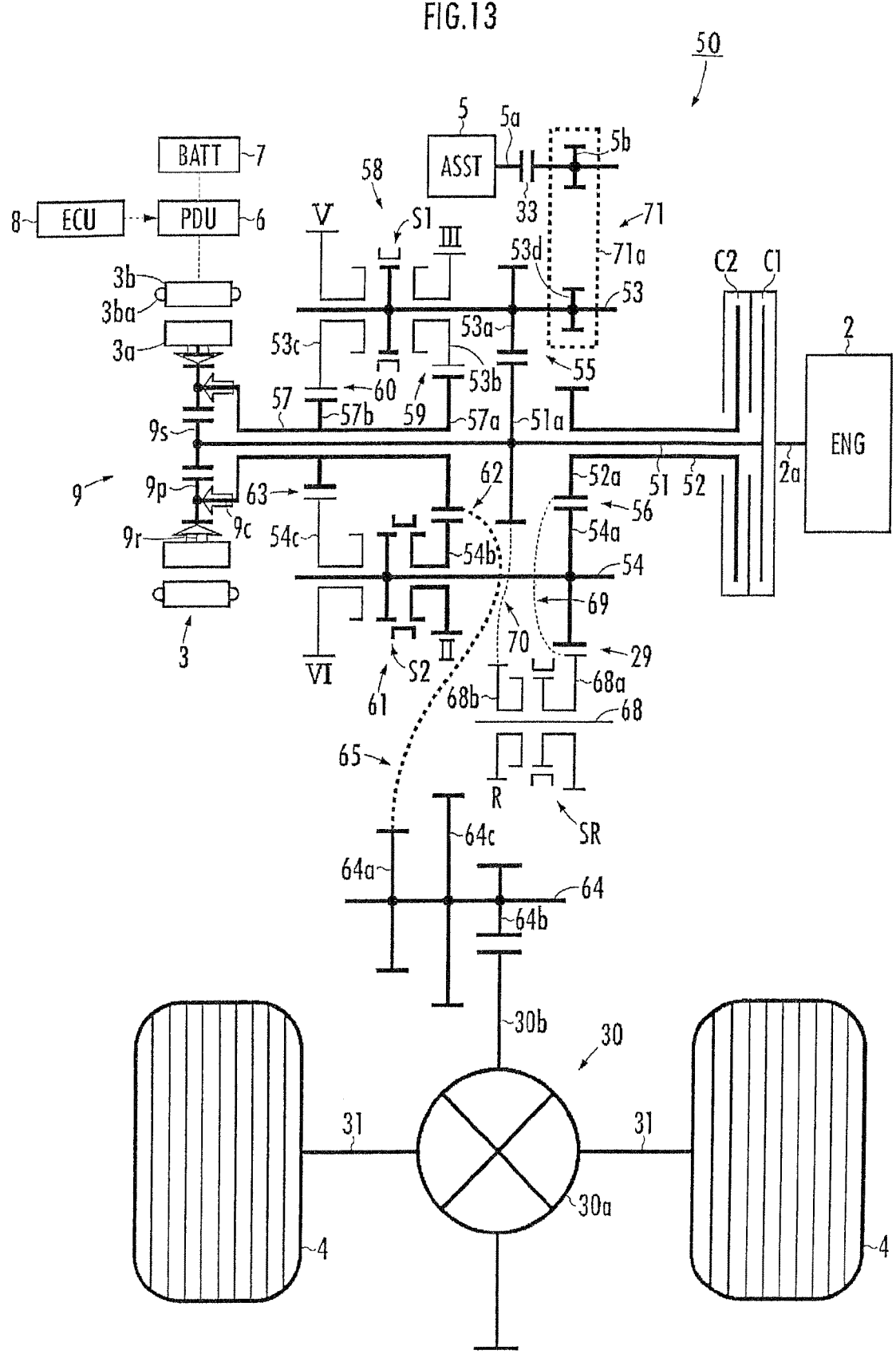
FIG. 13 is a diagram illustrating the operating state at a second speed stage in an assist running mode of the power transmitting device.

FIG. 13 illustrates the operating state of the power transmitting device 50 at the second speed stage in the assist running mode. At the second speed stage in the assist running mode, the ECU 8 sets the second clutch C2 to the ON state, the first synchronizer S1 and the reverse synchronizer SR to the neutral state, and the second synchronizer S2 to the second speed stage established state, and sets the electric motor 3 so as to cause the rotor 3a to rotate in the forward direction.

Thereby, in the same manner as the second speed stage in the engine running mode, the motive power from the output shaft 2a of the engine 2 is transmitted to the driving wheels 4 and 4 via the second clutch C2, the second main input shaft 52, the pair of speed increasing gears 56, the second sub input shaft 54, the second speed gear pair 62, the output shaft 57, the pair of counter gears 65, the counter shaft 64, the differential gear unit 30, and the axles 31 and 31. At this time, the carrier 9c rotates in the forward direction along with the output shaft 57, which rotates in the forward direction by the motive power from the engine 2. On the other hand, the ring gear 9r rotates in the forward direction along with the rotor 3a and therefore the carrier 9c also rotates in the forward direction by receiving a rotation torque also from the ring gear 9r. The motive power combined at the carrier 9c is transmitted to the driving wheels 4 and 4 via the output shaft 57, the pair of counter gears 65, the counter shaft 64, the differential gear unit 30, and the axles 31 and 31. In this manner, the combined motive power of the engine 2 and the electric motor 3 is transmitted to the driving wheels 4 and 4 and the driving wheels 4 and 4 rotate in the advancing direction of the vehicle. Moreover, if the requested power is less than the appropriate operating power or other similar cases, it is also possible to rotate the ring gear 9r in the reverse direction to cause the electric motor 3 to perform the regenerative operation, so that the vehicle runs in the regenerative running mode at the second speed stage.

A change from the second speed stage in the engine running mode to the second speed stage in the HEV running mode is possible only by starting the operation of the electric motor 3 and a change in the opposite direction is also possible only by stopping the operation of the electric motor 3, and therefore both changes are able to be easily and rapidly performed. Further, it is possible to cope with the changes without changing the variable speed stage in response to a change in the requested power. Consequently, the variation in the requested power is able to be absorbed by performing the power operation and the regenerative operation of the electric motor 3 with appropriate switching between the assist running mode and the regenerative running mode while the engine 2 is operated in an appropriate operating region, thereby enabling a reduction in the fuel consumption in the engine 2.

[HEV Running Mode, Second Speed Stage in Preparation for Third Speed Stage]

Figure 14:
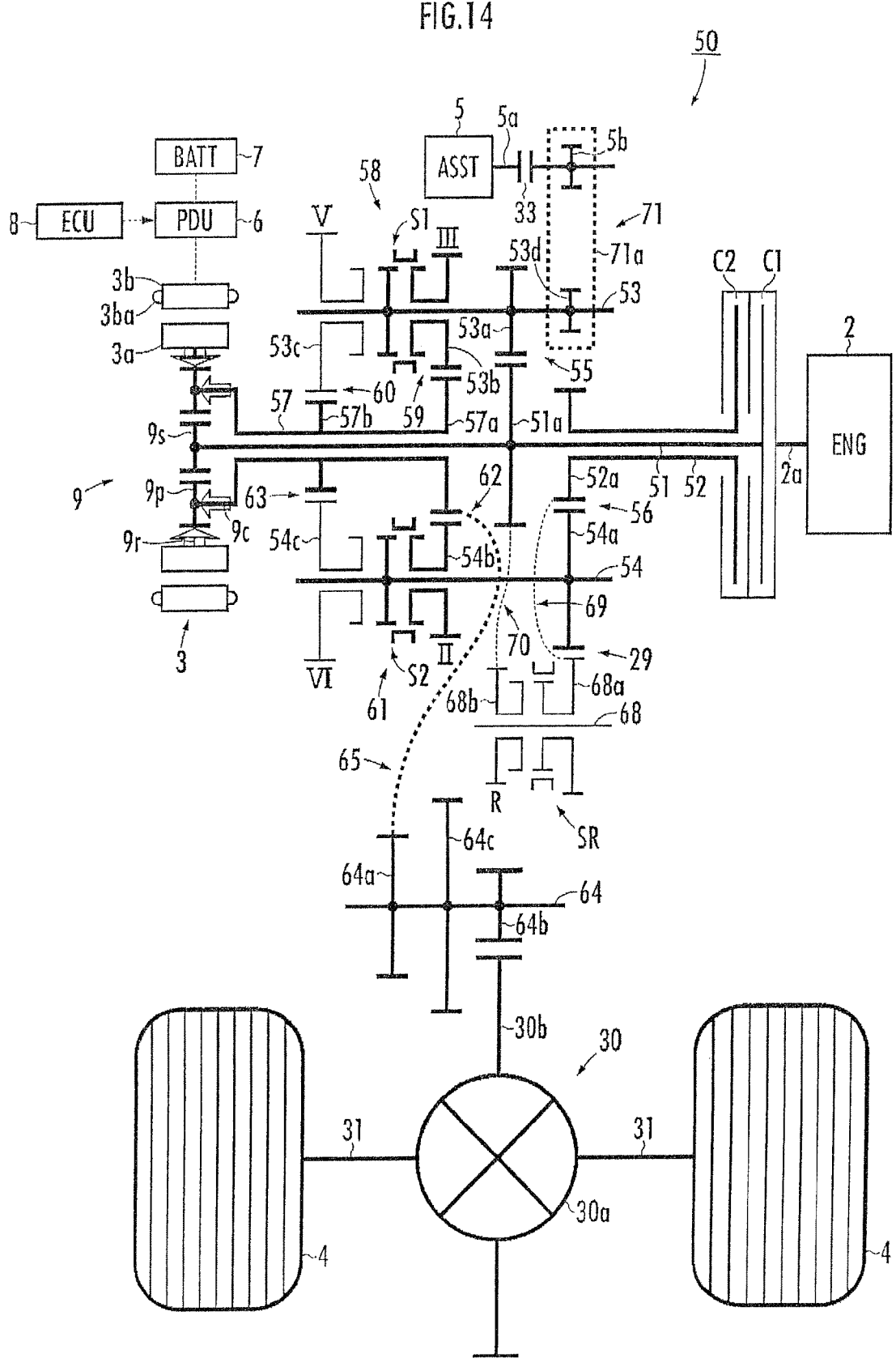
FIG. 14 is a diagram illustrating the operating state at the second speed stage in preparation for a third speed stage in the assist running mode of the power transmitting device.

FIG. 14 illustrates the operating state of the power transmitting device 50 at a second speed stage in preparation for a third speed stage in the assist running mode. The second speed stage in preparation for the third speed stage is a variable speed stage for use in performing second speed running while preparing for a gear shift to or from the third speed stage so that the second speed stage is shifted up to the third speed stage or the third speed stage is shifted down to the second speed stage smoothly.

At the second speed stage in preparation for the third speed stage in the assist running mode, the ECU 8 sets the second clutch C2 to the ON state, the first synchronizer S1 to the third speed stage established state, the second synchronizer S2 to the second speed stage established state, and the reverse synchronizer SR to the neutral state, and sets the electric motor 3 so as to cause the rotor 3a to rotate in the forward direction.

This adds a power transmission path through which a rotation torque is transmitted from the first main input shaft 51, which rotates in the forward direction along with the sun gear 9s, in the direction in which the carrier 9c rotates in the forward direction via the pair of reduction gears 55, the first sub input shaft 53, the third speed gear pair 59, and the output shaft 57, in addition to the power transmission path at the second speed stage in the HEV running mode. The motive power having passed through the power transmission path is combined with the motive power transmitted from the engine 2 via the second main input shaft 52, by which the carrier 9c rotates in the forward direction. Therefore, combined motive power also including the rotation torque generated by the rotation of the carrier 9c is transmitted to the driving wheels 4 and 4.

[HEV Running Mode, Third Speed Stage in Preparation for Second Speed Stage]

Figure 15:
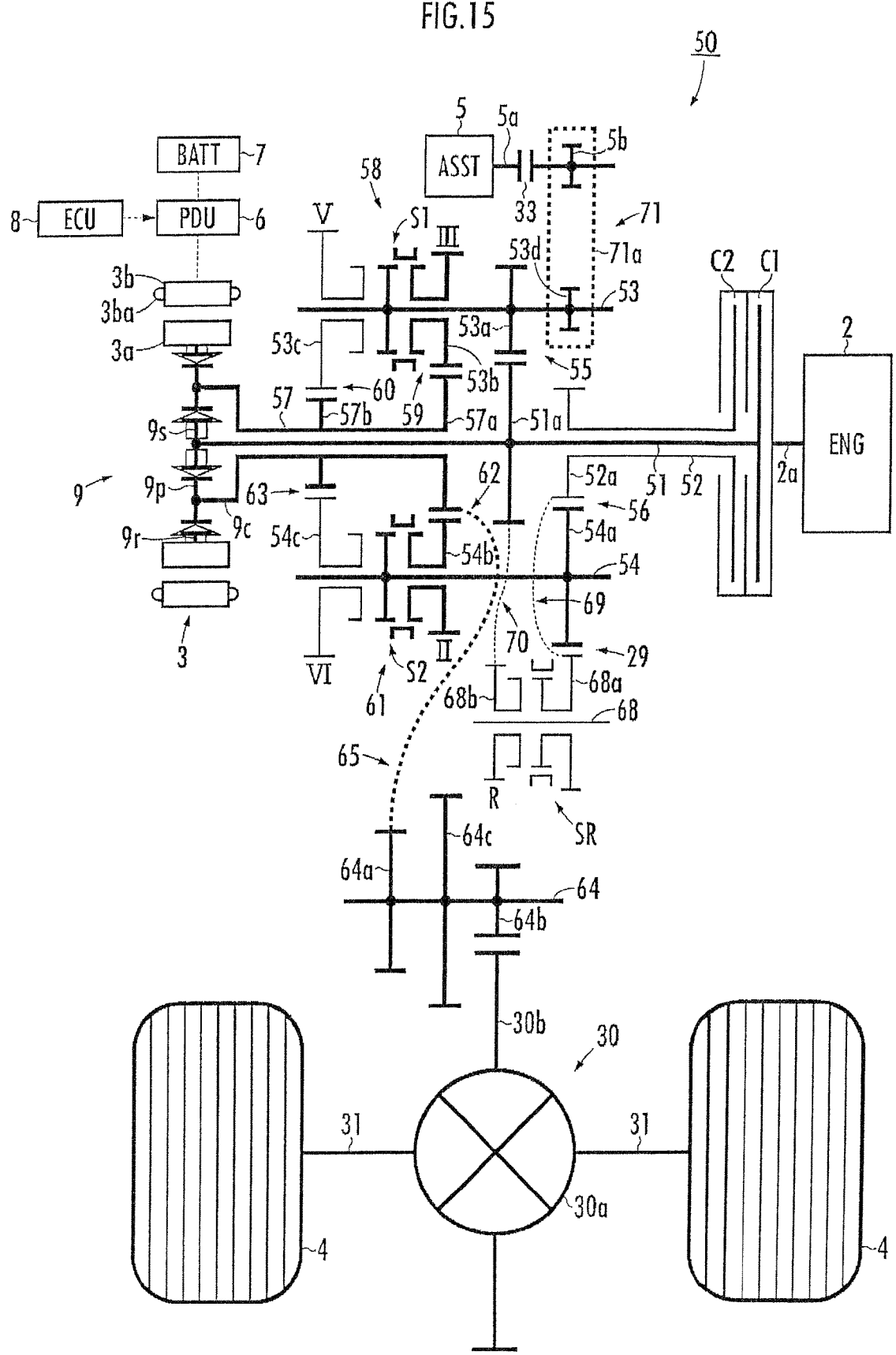
FIG. 15 is a diagram illustrating the operating state at the third speed stage in preparation for the second speed stage in the assist running mode of the power transmitting device.

FIG. 15 illustrates the operating state of the power transmitting device 50 at the third speed stage in preparation for the second speed stage in the assist running mode. A change from the second speed stage in preparation for the third speed stage in the HEV running mode to the third speed stage in the HEV running mode is performed by passing through the third speed stage in preparation for the second speed stage in the HEV running mode. The third speed stage in preparation for the second speed stage is a variable speed stage for use in performing third speed running while preparing for a gear shift to or from the second speed stage so that the third speed stage is shifted down to the second speed stage or the second speed stage is shifted up to the third speed stage smoothly.

When the second speed stage in preparation for the third speed stage in the HEY running mode is changed to the third speed stage in preparation for the second speed stage in the HEV running mode, the ECU 8 sets the first clutch C1 to the ON state and sets the second clutch C2 to the OFF state.

Thereby, the motive power from the output shaft 2a of the engine 2 is transmitted to the driving wheels 4 and 4 via the first clutch C1, the first main input shaft 51, the pair of reduction gears 55, the first sub input shaft 53, the third speed gear pair 59, the output shaft 57, the pair of counter gears 65, the counter shaft 64, the differential gear unit 30, and the axles 31 and 31, and the driving wheels 4 and 4 rotate in the advancing direction of the vehicle. Due to the power transmission path, the carrier 9c rotates in the forward direction along with the output shaft 57, which rotates in the forward direction by the motive power from the engine 2, and the sun gear 9s rotates in the forward direction along with the first main input shaft 51 by the motive power from the engine 2. Here, the rotation speed of the carrier 9c differs from that of the sun gear 9s and therefore the ring gear 9r rotates in the forward direction or in the reverse direction according to the difference in the rotation speed. If the ring gear 9r rotates in the forward direction, the electric motor 3 performs the power operation. If the ring gear 9r rotates in the reverse direction, the electric motor 3 performs the regenerative operation. Although the second sub input shaft 54 rotates along with the rotation of the output shaft 57, the second sub input shaft 54 does not contribute to the combination of the motive powers.

In this manner, a change from the second speed stage in preparation for the third speed stage in the HEV running mode to the third speed stage in preparation for the second speed stage in the HEV running mode is able to be performed only by changing the connected state between the first clutch. C1 and the second clutch C2, and therefore the change is able to be easily and rapidly performed. Although not illustrated, it is possible to set the third speed stage in preparation for the fourth speed stage in the HEV running mode by placing the second synchronizer S2 in the fourth speed stage established state.

[HEV Running Mode, Third Speed Stage]

Figure 16:
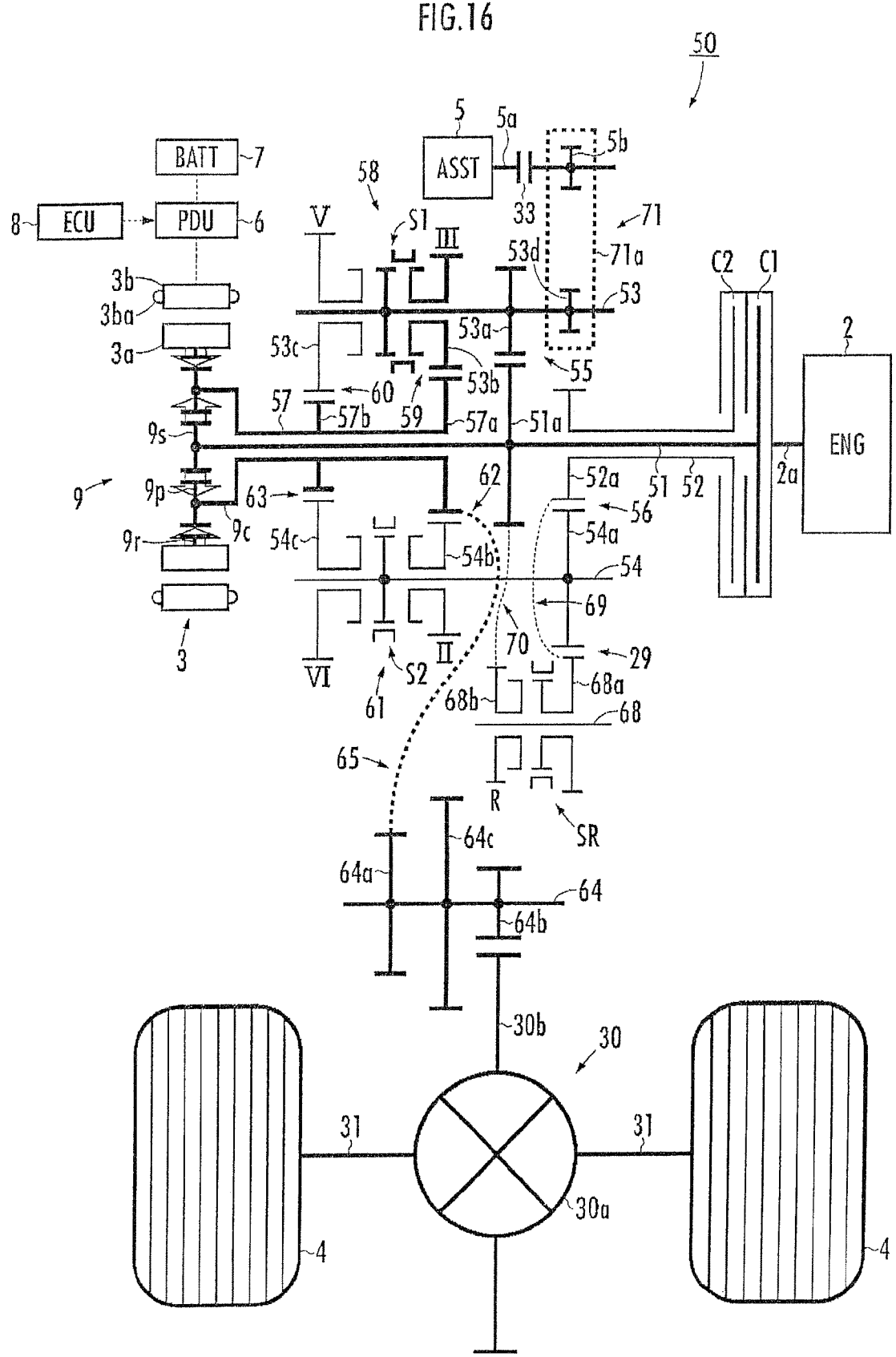
FIG. 16 is a diagram illustrating the operating state at the third speed stage in the assist running mode of the power transmitting device.

FIG. 16 illustrates the operating state of the power transmitting device 50 at the third speed stage in the assist running mode. When the third speed stage in preparation for the second speed stage in the HEV running mode is changed to the third speed stage in the HEV running mode, the ECU 8 sets the second synchronizer S2 to the neutral state. As described above, the second sub input shaft 54 does not contribute to the combination of the motive powers at the third speed stage in preparation for the second speed stage in the HEV running mode. Therefore, even if the second sub input shaft 54 is connected to the second speed gear pair 62, there is no change in the power transmission path.

In this manner, a change from the third speed stage in preparation for the second speed stage in the HEV running mode to the third speed stage in the HEV running mode is able to be performed only by setting the second synchronizer S2 to the neutral state, and therefore the change is able to be easily and rapidly performed. In addition, a change between the second speed stage and the third speed stage in the HEV running mode is able to be easily and rapidly performed through the second speed stage in preparation for the third speed stage and the third speed stage in preparation for the second speed stage in the HEV running mode.

[Engine Running Mode, Fourth Speed Stage]

Figure 17:
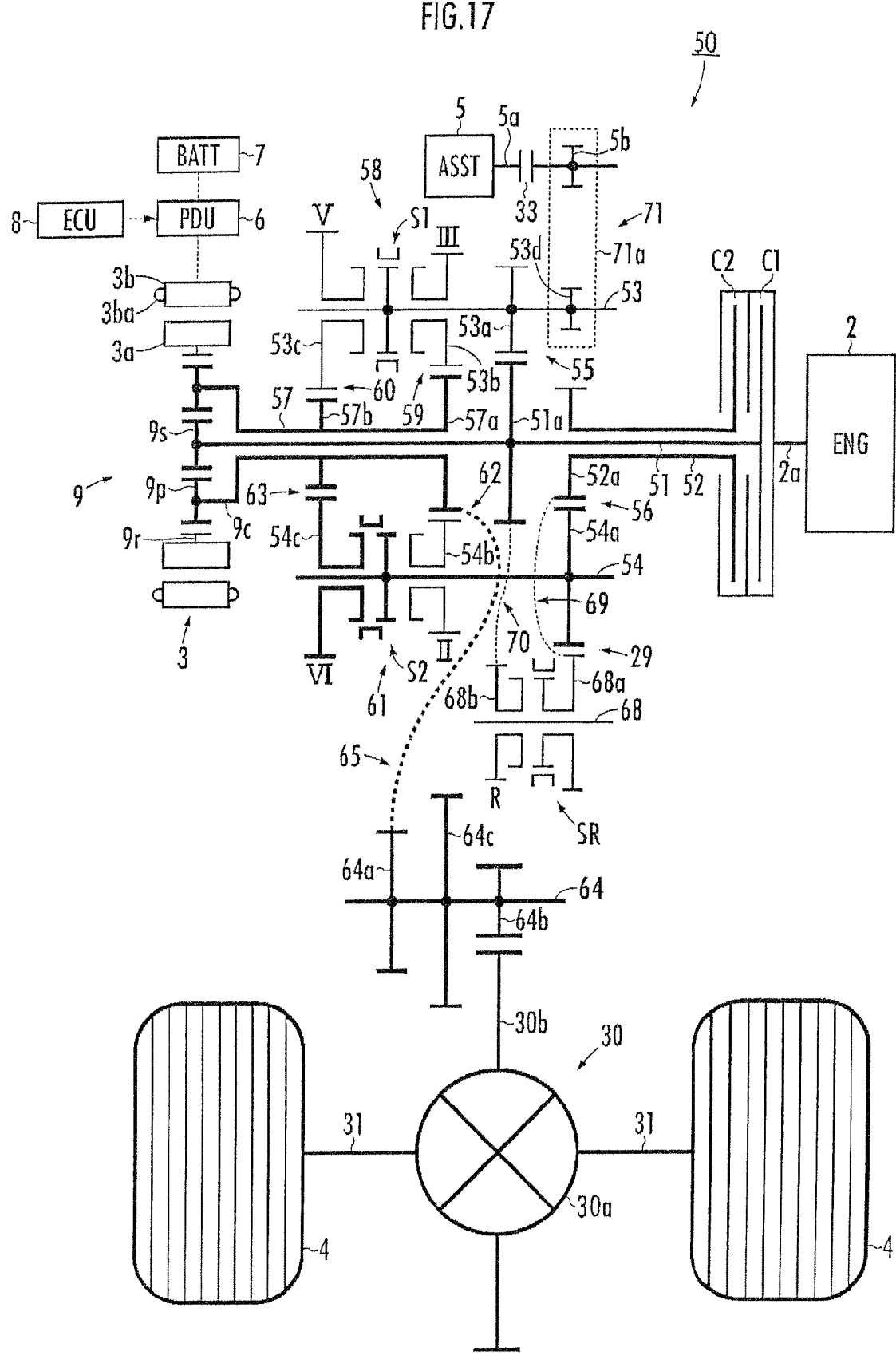
FIG. 17 is a diagram illustrating the operating state at a fourth speed stage in the engine running mode of the power transmitting device.

FIG. 17 illustrates the operating state of the power transmitting device 50 at the fourth speed stage in the engine running mode. At the fourth speed stage in the engine running mode, the ECU 8 sets the second clutch C2 to the ON state, the first synchronizer S1 and the reverse synchronizer SR to the neutral state, and the second synchronizer S2 to the fourth speed stage established state.

Thereby, the motive power from the output shaft 2a of the engine 2 is transmitted to the driving wheels 4 and 4 via the second clutch C2, the second main input shaft 52, the pair of speed increasing gears 56, the second sub input shaft 54, the fourth speed gear pair 63, the output shaft 57, the pair of counter gears 65, the counter shaft 64, the differential gear unit 30, and the axles 31 and 31. Thereby, the driving wheels 4 and 4 rotate in the advancing direction of the vehicle only with the motive power of the engine 2 in the advancing state at the fourth speed stage. At this time, the carrier 9c rotates in the forward direction along with the output shaft 57, but the sun gear 9s and the ring gear 9r do not receive the motive power. Therefore, the sun gear 9s corotates with the planetary gear 9p and thus rotates in the forward direction, the ring gear 9r does not rotate, and the electric motor 3 performs none of the power operation and the regenerative operation. In addition, the first main input shaft 51 rotates in the forward direction along with the sun gear 9s and the motive power is transmitted to the input shaft 5a of the auxiliary device 5 via the pair of reduction gears 55, the first sub input shaft 53, the belt mechanism 71, and the auxiliary device clutch 33.

[HEV Running Mode, Fourth Speed Stage in Preparation for Third Speed Stage]

Figure 18:
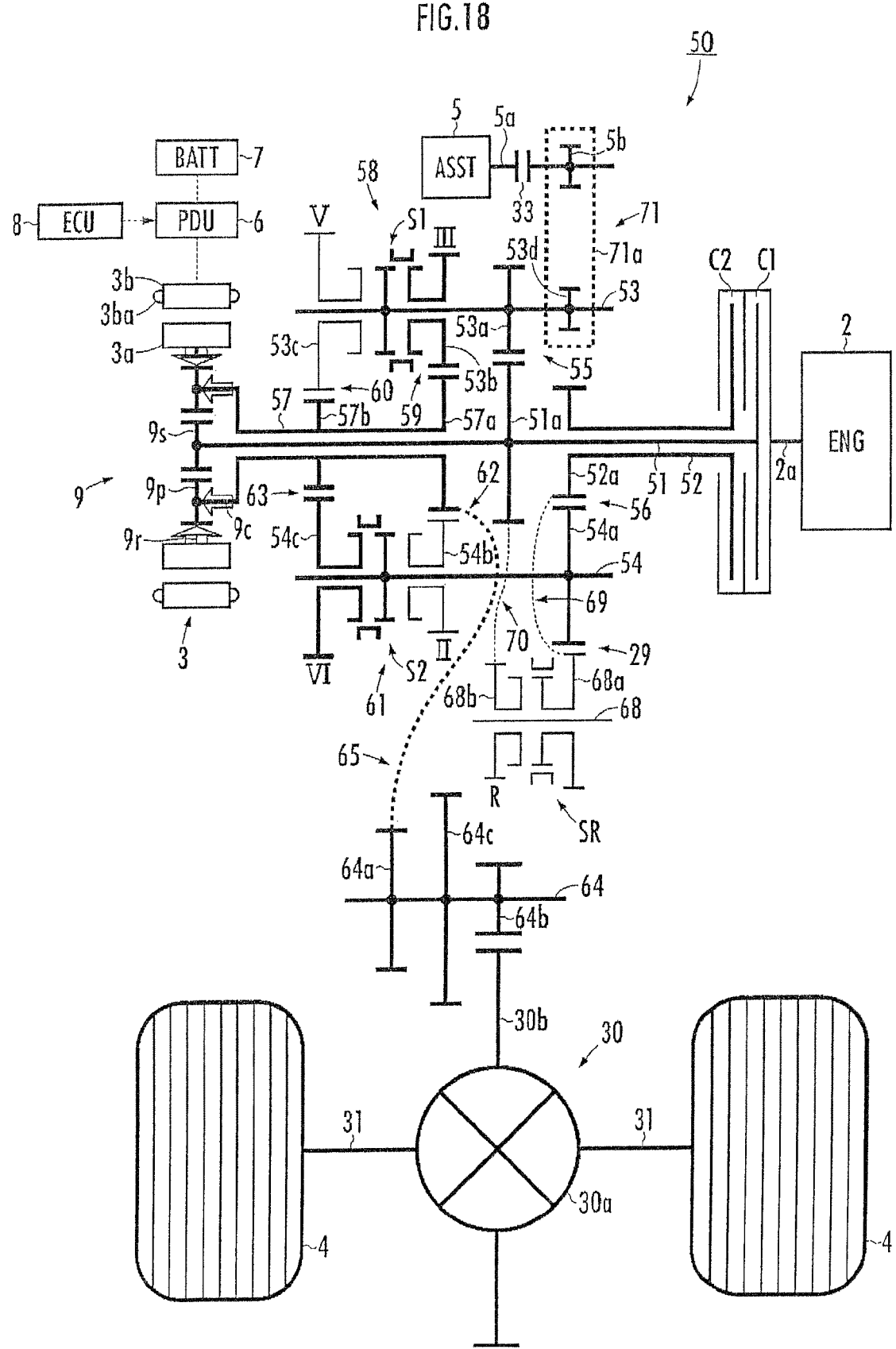
FIG. 18 is a diagram illustrating the operating state at the fourth speed stage in preparation for the third speed stage in the assist running mode of the power transmitting device.

FIG. 18 illustrates the operating state of the power transmitting device 50 at the fourth speed stage in preparation for the third speed stage in the HEV running mode. A change from the third speed stage in preparation for the fourth speed stage in the HEV running mode to the fourth speed stage in the HEV running mode is performed through the fourth speed stage in preparation for the third speed stage in the HEV running mode.

When the third speed stage in preparation for the fourth speed stage in the HEV running mode is changed to the fourth speed stage in preparation for the third speed stage in the HEV running mode, the ECU 8 sets the first clutch C1 to the OFF state and the second clutch C2 to the ON state.

Thereby, the motive power from the output shaft 2a of the engine 2 is transmitted to the driving wheels 4 and 4 via the second clutch C2, the second main input shaft 52, the pair of speed increasing gears 56, the second sub input shaft 54, the fourth speed gear pair 63, the output shaft 57, the pair of counter gears 65, the counter shaft 64, the differential gear unit 30, and the axles 31 and 31, and the driving wheels 4 and 4 rotate in the advancing direction of the vehicle. In the same manner as the fourth speed stage in preparation for the third speed stage in the HEV running mode, the ring gear 9r rotates in the forward direction or in the reverse direction according to a difference in the rotation speed between the carrier 9c and the sun gear 9s. If the ring gear 9r rotates in the forward direction, the electric motor 3 performs the power operation. If the ring gear 9r rotates in the reverse direction, the electric motor 3 performs the regenerative operation. Although the first sub input shaft 53 rotates along with the rotation of the output shaft 57, the first sub input shaft 53 does not contribute to the combination of the motive powers.

In this manner, a change from the third speed stage in preparation for the fourth speed stage in the HEV running mode to the fourth speed stage in preparation for the third speed stage in the HEV running mode is able to be performed only by changing the connected state between the first clutch C1 and the second clutch C2, and therefore the change is able to be easily and rapidly performed.

[HEV Running Mode, Fourth Speed Stage]

Figure 19:
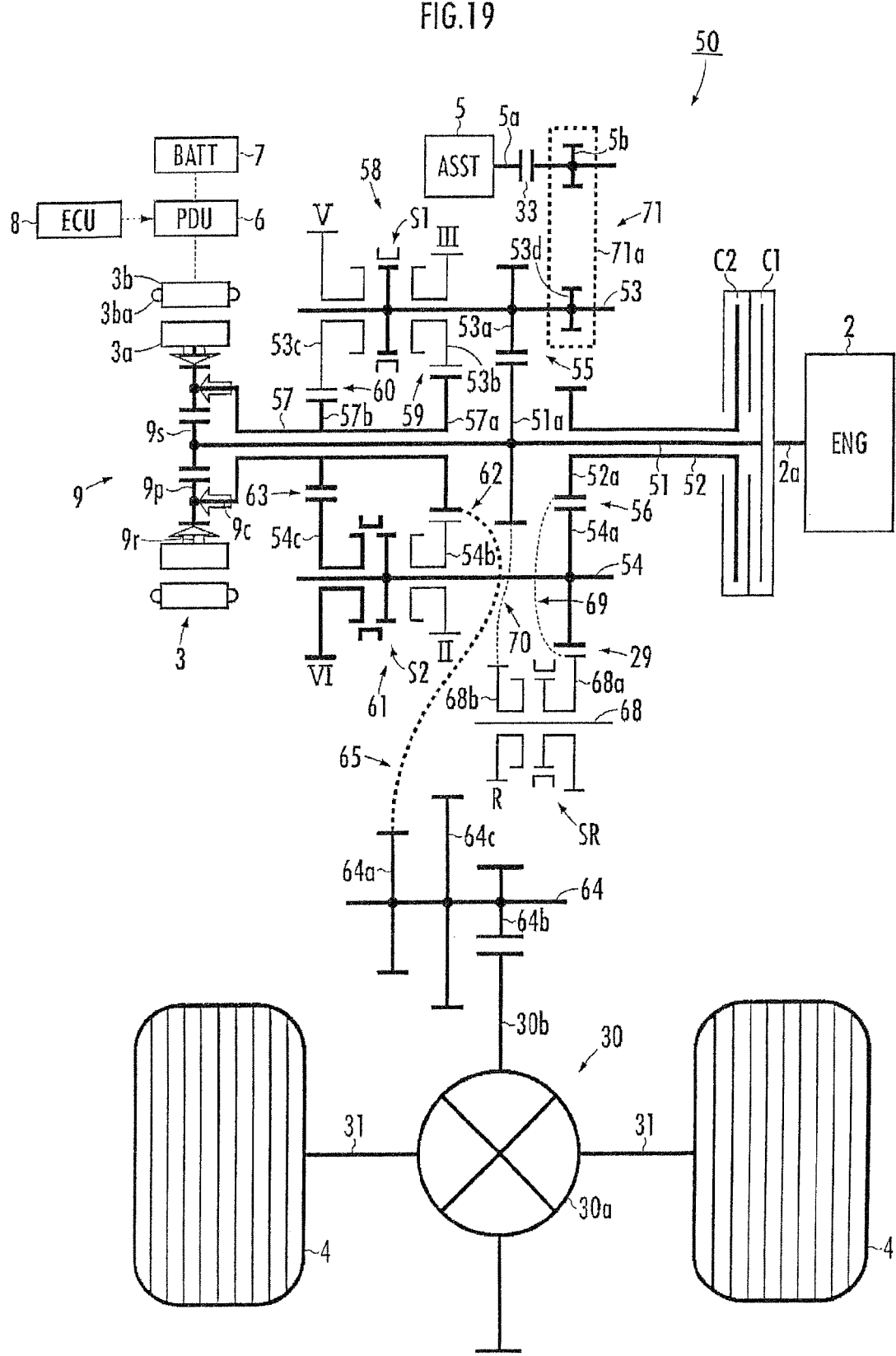
FIG. 19 is a diagram illustrating the operating state at the fourth speed stage in the assist running mode of the power transmitting device.

FIG. 19 illustrates the operating state of the power transmitting device 50 at the fourth speed stage in the assist running mode. At the fourth speed stage in the assist running mode, the ECU 8 sets the second clutch C2 to the ON state, the first synchronizer S1 and the reverse synchronizer SR to the neutral state, and the second synchronizer S2 to the fourth speed stage established state, and sets the electric motor 3 so as to cause the rotor 3a to rotate in the forward direction.

Thereby, the motive power from the output shaft 2a of the engine 2 is transmitted to the driving wheels 4 and 4 via the second clutch C2, the second main input shaft 52, the pair of speed increasing gears 56, the second sub input shaft 54, the fourth speed gear pair 63, the output shaft 57, the pair of counter gears 65, the counter shaft 64, the differential gear unit 30, and the axles 31 and 31. At this time, in the same manner as for the second speed stage in the assist running mode, the combined motive power of the engine 2 and the electric motor 3 is transmitted to the driving wheels 4 and 4. Moreover, if the requested power is less than the appropriate operating power or other similar cases, it is also possible to rotate the ring gear 9r in the reverse direction to cause the electric motor 3 to perform the regenerative operation, so that the vehicle runs in the regenerative running mode at the second speed stage.

A change from the fourth speed stage in the engine running mode to the fourth speed stage in the assist running mode is possible only by controlling the electric motor 3 so that the rotor 3a rotates in the forward direction, and a change in the opposite direction is also possible only by stopping the operation of the electric motor 3, and therefore both changes are able to be easily and rapidly performed. Further, it is possible to cope with the changes without changing the variable speed stage in response to a change in the requested power. Consequently, the variation in the requested power is able to be absorbed by performing the power operation and the regenerative operation of the electric motor 3 with appropriate switching between the assist running mode and the regenerative running mode while the engine 2 is operated in an appropriate operating region, thereby enabling a reduction in the fuel consumption in the engine 2.

[HEV Running Mode, Fourth Speed Stage in Preparation for Fifth Speed Stage]

Figure 20:
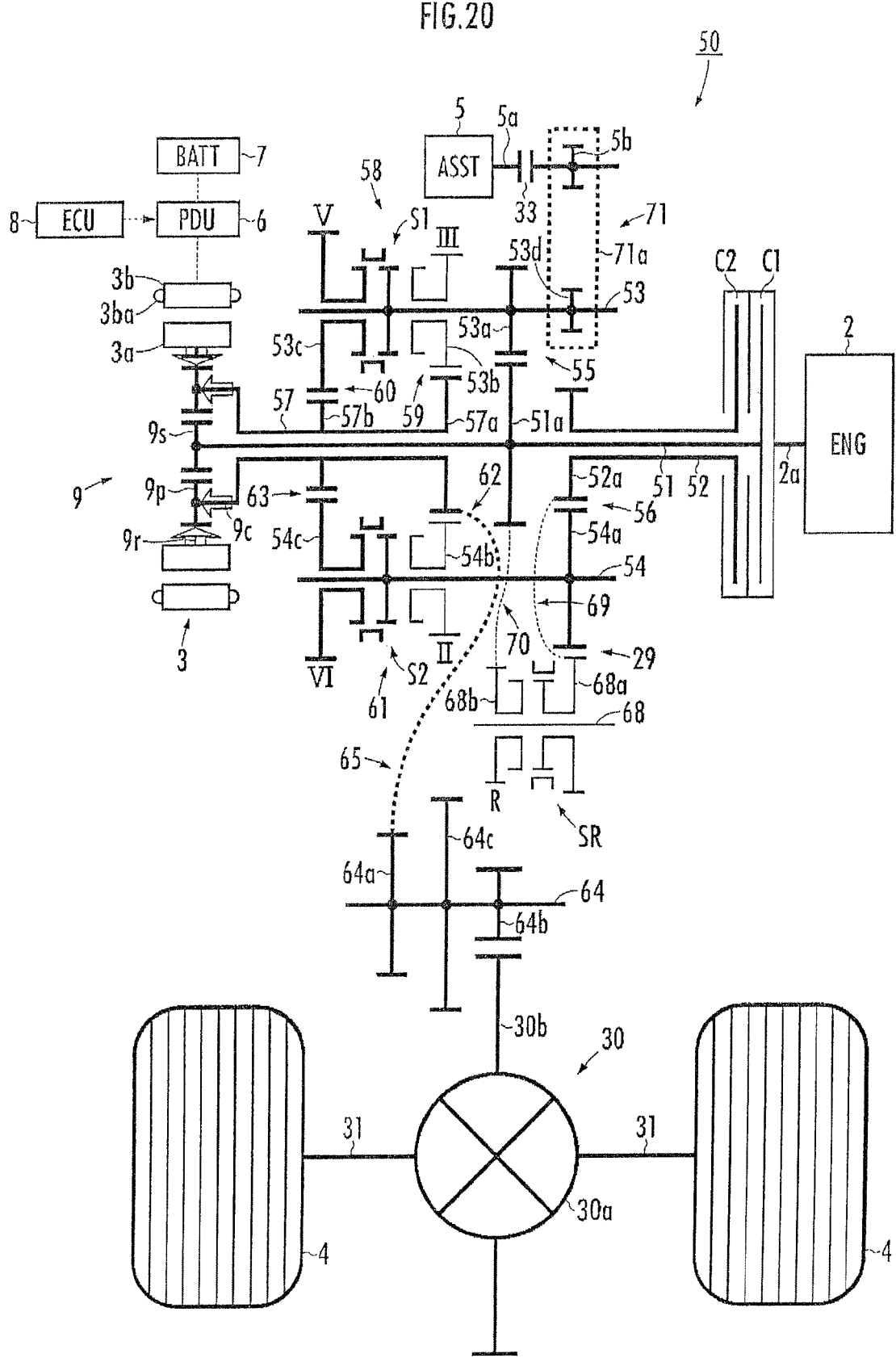
FIG. 20 is a diagram illustrating the operating state at the fourth speed stage in preparation for a fifth speed stage in the assist running mode of the power transmitting device.

FIG. 20 illustrates the operating state of the power transmitting device 50 at the fourth speed stage in preparation for the fifth speed stage in the assist running mode. At the fourth speed stage in preparation for the fifth speed stage in the assist running mode, the ECU 8 sets the second clutch C2 to the ON state, the first synchronizer S1 to the fifth speed stage established state, the second synchronizer S2 to the fourth speed stage established state, and the reverse synchronizer SR to the neutral state, and sets the electric motor 3 so as to cause the rotor 3a to rotate in the forward direction.

This adds a power transmission path through which a rotation torque is transmitted from the first main input shaft 51, which rotates in the forward direction along with the sun gear 9s, in the direction in which the carrier 9c rotates in the forward direction via the pair of reduction gears 55, the first sub input shaft 53, the fifth speed gear pair 60, and the output shaft 57, in addition to the power transmission path at the second speed stage in the assist running mode. The motive power having passed through the power transmission path is combined with the motive power transmitted from the engine 2 via the second main input shaft 52, by which the carrier 9c rotates in the forward direction. Therefore, combined motive power also including the rotation torque generated by the rotation of the carrier 9c is transmitted to the driving wheels 4 and 4.

[HEV Running Mode, Fifth Speed Stage in Preparation for Fourth Speed Stage]

Figure 21:
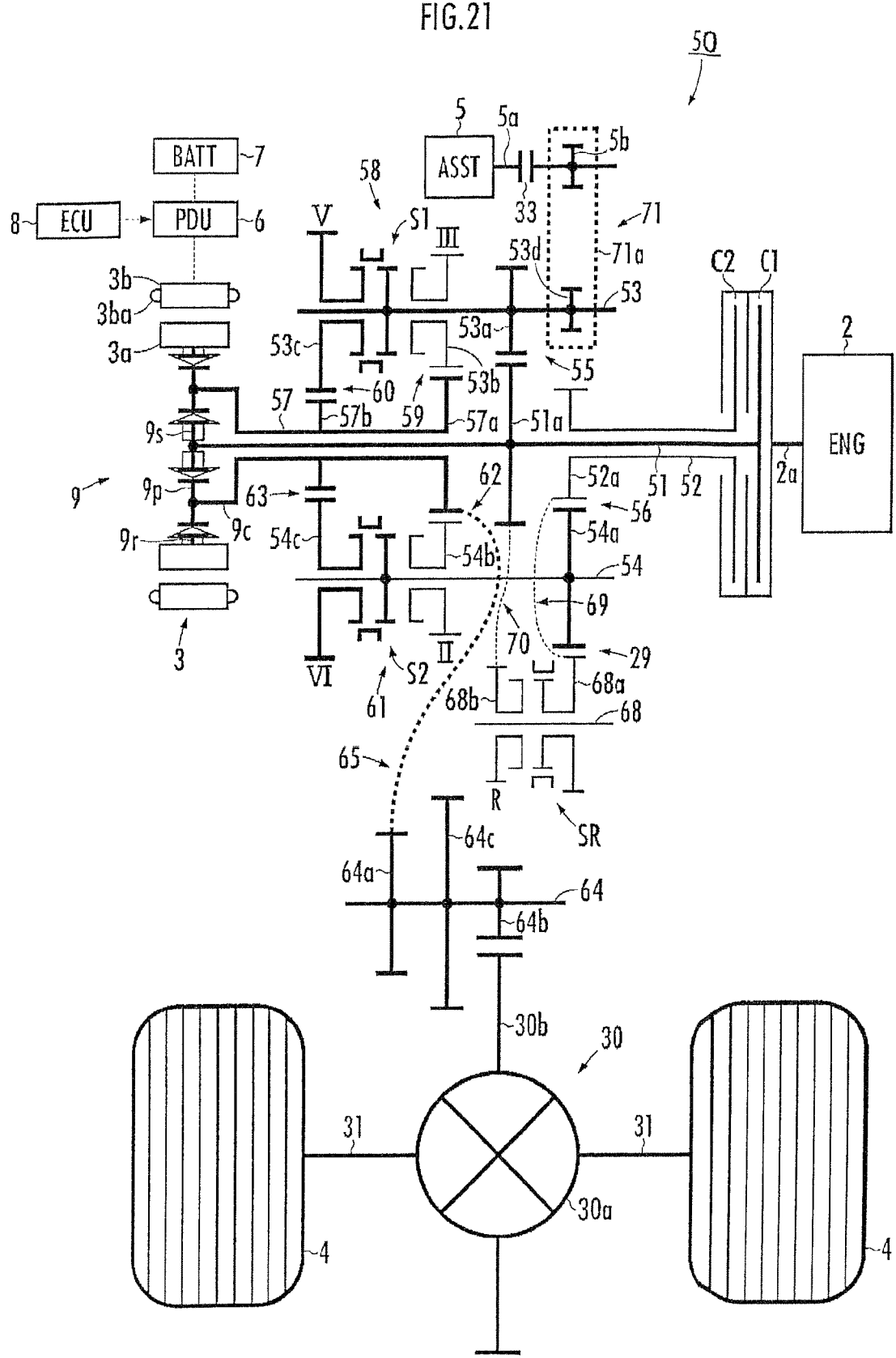
FIG. 21 is a diagram illustrating the operating state at the fifth speed stage in preparation for the fourth speed stage in the assist running mode of the power transmitting device.

FIG. 21 illustrates the operating state of the power transmitting device 50 at the fifth speed stage in preparation for the fourth speed stage in the assist running mode. A change from the fourth speed stage in preparation for the fifth speed stage in the HEV running mode to the fifth speed stage in the HEV running mode is performed by passing through the fifth speed stage in preparation for the fourth speed stage in the HEV running mode.

When the fourth speed stage in preparation for the fifth speed stage in the HEV running mode is changed to the fifth speed stage in preparation for the fourth speed stage in the HEV running mode, the ECU 8 sets the first clutch C1 to the ON state and sets the second clutch C2 to the OFF state.

Thereby, the motive power from the output shaft 2a of the engine 2 is transmitted to the driving wheels 4 and 4 via the first clutch C1, the first main input shaft 51, the pair of reduction gears 55, the first sub input shaft 53, the fifth speed gear pair 60, the output shaft 57, the pair of counter gears 65, the counter shaft 64, the differential gear unit 30, and the axles 31 and 31, and the driving wheels 4 and 4 rotate in the advancing direction of the vehicle. Further, in the same manner as the third speed stage in preparation for the second speed stage in the HEV running mode, the ring gear 9r rotates in the forward direction or in the reverse direction according to a difference in the rotation speed between the carrier 9c and the sun gear 9s. If the ring gear 9r rotates in the forward direction, the electric motor 3 performs the power operation. If the ring gear 9r rotates in the reverse direction, the electric motor 3 performs the regenerative operation. Although the second sub input shaft 54 rotates along with the rotation of the output shaft 57, the second sub input shaft 54 does not contribute to the combination of the motive powers.

In this manner, a change from the fourth speed stage in preparation for the fifth speed stage in the HEY running mode to the fifth speed stage in preparation for the fourth speed stage in the HEV running mode is able to be performed only by changing the connected state between the first clutch C1 and the second clutch C2, and therefore the change is able to be easily and rapidly performed.

[HEY Running Mode, Fifth Speed Stage]

Figure 22:
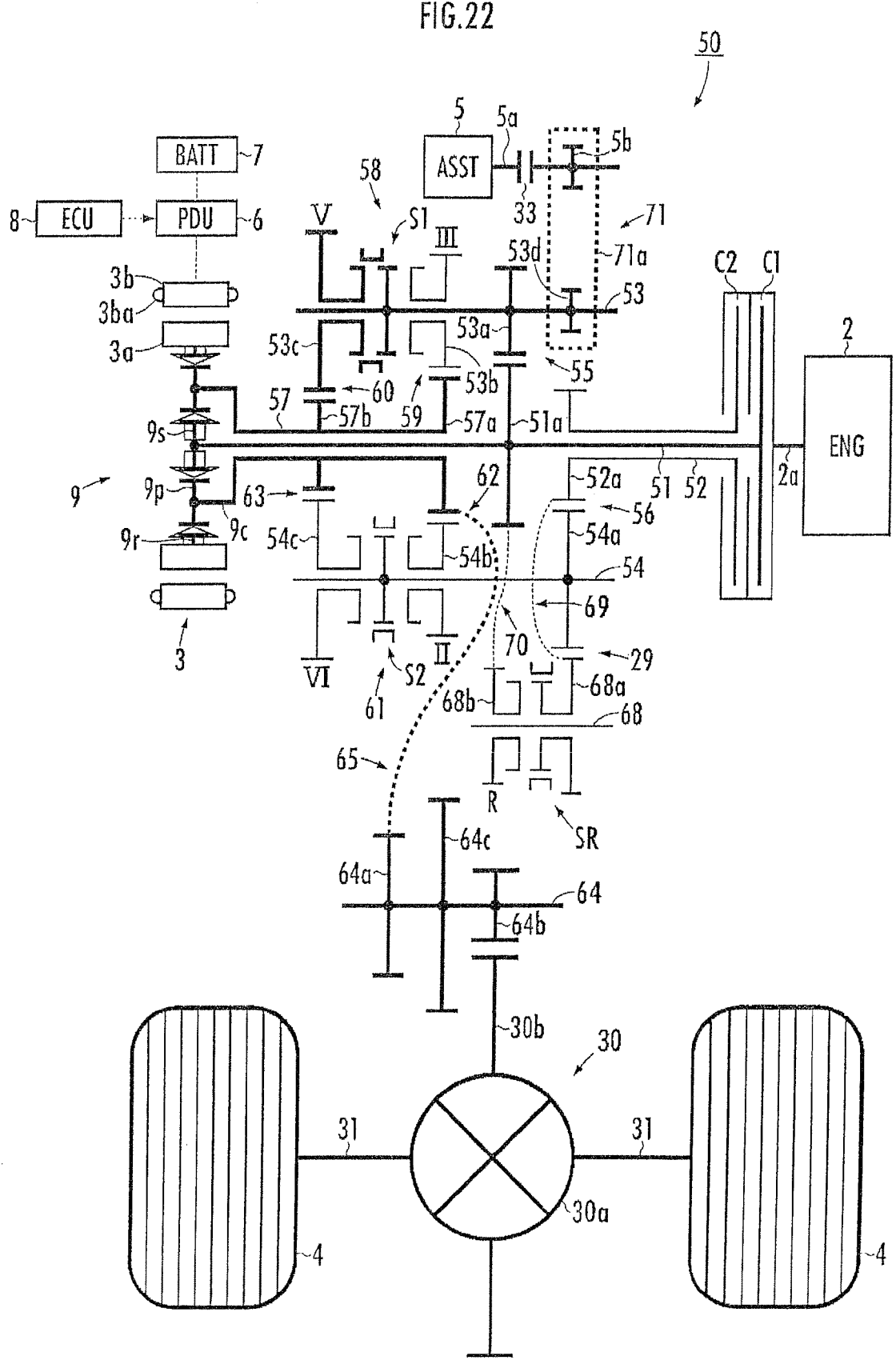
FIG. 22 is a diagram illustrating the operating state at the fifth speed stage in the assist running mode of the power transmitting device.

FIG. 22 illustrates the operating state of the power transmitting device 50 at the fifth speed stage in the assist running mode. When the fifth speed stage in preparation for the fourth speed stage in the HEV running mode is changed to the fifth speed stage in the HEV running mode, the ECU 8 sets the second synchronizer S2 to the neutral state. As described above, the second sub input shaft 54 does not contribute to the combination of the motive powers at the fifth speed stage in preparation for the fourth speed stage in the HEV running mode. Therefore, even if the second sub input shaft 54 is connected to the fourth speed gear pair 63, there is no change in the power transmission path.

In this manner, a change from the fifth speed stage in preparation for the fourth speed stage in the HEV running mode to the fifth speed stage in the HEV running mode is able to be performed only by setting the second synchronizer S2 to the neutral state, and therefore the change is able to be easily and rapidly performed. In addition, a change between the fourth speed stage and the fifth speed stage in the HEV running mode is able to be easily and rapidly performed through the fourth speed stage in preparation for the fifth speed stage and the fifth speed stage in preparation for the fourth speed stage in the HEV running mode.

[EV Running Mode, Third Speed Stage]

Figure 23:
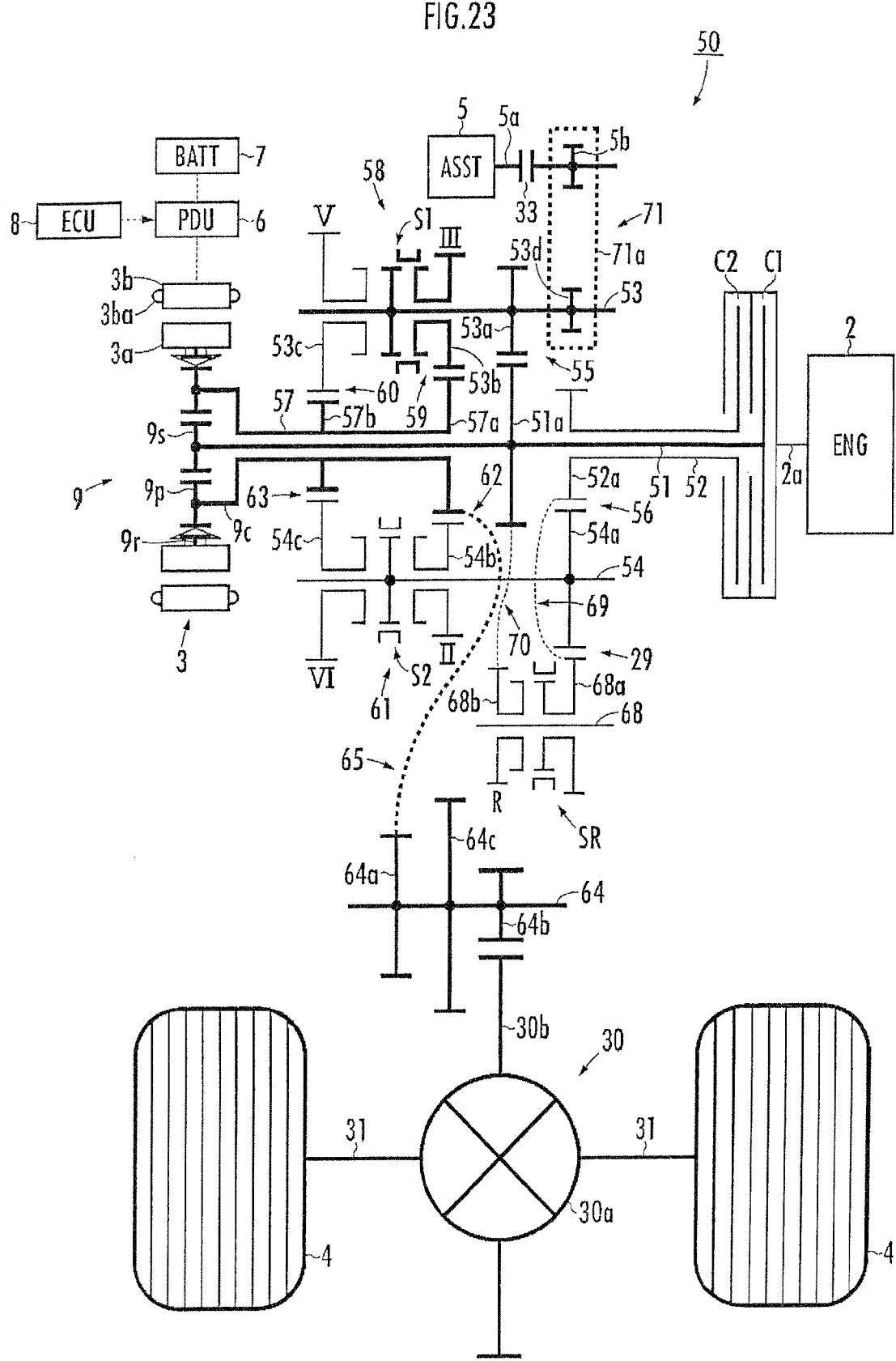
FIG. 23 is a diagram illustrating the operating state at the third speed stage in an EV running mode of the power transmitting device.

FIG. 23 illustrates the operating state of the power transmitting device 50 at the third speed stage in the EV running mode. At the third speed stage in the EV running mode, the ECU 8 sets the first clutch C1 and the second clutch C2 to the OFF state, the first synchronizer S1 to the third speed stage established state, and the second synchronizer S2 and the reverse synchronizer SR to the neutral state, and sets the electric motor 3 so as to cause the rotor 3a to rotate in the forward direction.

Thereby, when the ring gear 9r rotates in the forward direction along with the rotor 3a, the carrier 9c, which receives the rotation torque from the ring gear 9r, begins to rotate in the forward direction. Further, the carrier 9c is connected to the sun gear 9s via the output shaft 57, the third speed gear pair 59, the first sub input shaft 53, the pair of reduction gears 55, and the first main input shaft 51, and therefore the sun gear 9s begins to rotate in the forward direction. Thereby, the carrier 9c rotates in the forward direction and the rotation torque thereof is transmitted to the driving wheels 4 and 4 via the output shaft 57, the pair of counter gears 65, the counter shaft 64, the differential gear unit 30, and the axles 31 and 31. Thus, the driving wheels 4 and 4 rotate in the advancing direction of the vehicle only with the motive power of the electric motor 3. At this time, the output shaft 2a of the engine 2 is disconnected from the first main input shaft 51 and the second main input shaft 52. Therefore, in the EV running mode, the motive power is not transmitted from the electric motor 3 to the output shaft 2a of the engine 2 and thus the engine 2 is prevented from remaining in drive.

Further, although not illustrated, the engine 2 is able to be started by the ECU 8 through setting the first clutch C1 to the ON state when the vehicle is running at the third speed stage in the EV running mode. At this time, the motive power output from the output shaft 2a of the engine 2 is transmitted to the driving wheels 4 and 4 via the first clutch C1, the first main input shaft 51, the pair of reduction gears 55, the first sub input shaft 53, the third speed gear pair 59, the output shaft 57, the pair of counter gears 65, the counter shaft 64, the differential gear unit 30, and the axles 31 and 31 and further input to the differential rotation mechanism 9 as motive power for rotating the sun gear 9s in the forward direction via the first main input shaft 51 and as motive power for rotating the carrier 9c in the forward direction from the first sub input shaft 53 via the third speed gear pair 59 and the output shaft 57. Thereby, the combined motive power of the engine 2 and the electric motor 3 is transmitted to the driving wheels 4 and 4, by which the third speed stage in the assist running mode is set.

Moreover, the engine 2 is able to be started by the ECU 8 through setting the first clutch C1 to the ON state and setting the second synchronizer S2 to the second speed stage established state or to the fourth speed stage established state when the vehicle is running at the third speed stage in the EV running mode. At this time, the third speed stage in preparation for the second speed stage or the third speed stage in preparation for the fourth speed stage in the HEV running mode is set.

[EV Running Mode, Fifth Speed Stage]

Figure 24:
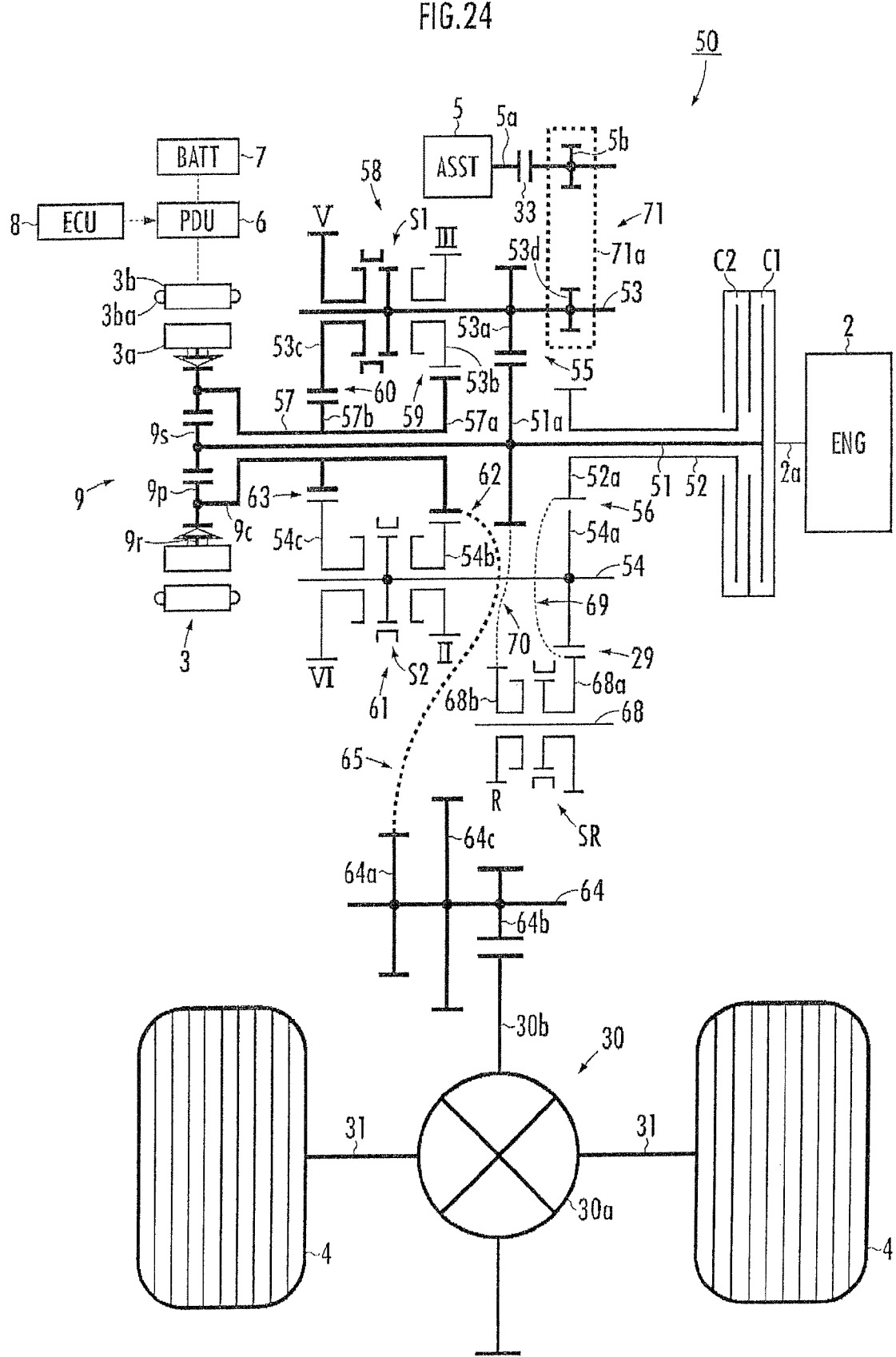
FIG. 24 is a diagram illustrating the operating state at the fifth speed stage in the EV running mode of the power transmitting device.

FIG. 24 illustrates the operating state of the power transmitting device 50 at the fifth speed stage in the EV running mode. At the fifth speed stage in the EV running mode, the ECU 8 sets the first clutch C1 and the second clutch C2 to the OFF state, the first synchronizer S1 to the fifth speed stage established state, and the second synchronizer S2 and the reverse synchronizer SR to the neutral state, and sets the electric motor 3 so as to cause the rotor 3a to rotate in the forward direction. Thereby, in the same manner as the third speed stage in the EV running mode, the driving wheels 4 and 4 rotate in the advancing direction of the vehicle only with the motive power of the electric motor 3.

Further, although not illustrated, the engine 2 is able to be started by the ECU 8 through setting the first clutch C1 to the ON state when the vehicle is running at the fifth speed stage in the EV running mode. Thereby, the combined motive power of the engine 2 and the electric motor 3 is transmitted to the driving wheels 4 and 4, by which the fifth speed stage in the assist running mode is set.

Moreover, the engine 2 is able to be started by the ECU 8 through setting the first clutch C1 to the ON state and setting the second synchronizer S2 to the fourth speed stage established state when the vehicle is running at the fifth speed stage in the EV running mode. At this time, the fifth speed stage in preparation for the fourth speed stage in the assist running mode is set.

[Fourth Embodiment]

A power transmitting device 80 for a hybrid vehicle according to a fourth embodiment of the present invention will be described below with reference to accompanying drawings. The power transmitting device 80 has only three forward speed stages and one backward speed stage as variable speed stages.

Figure 25:
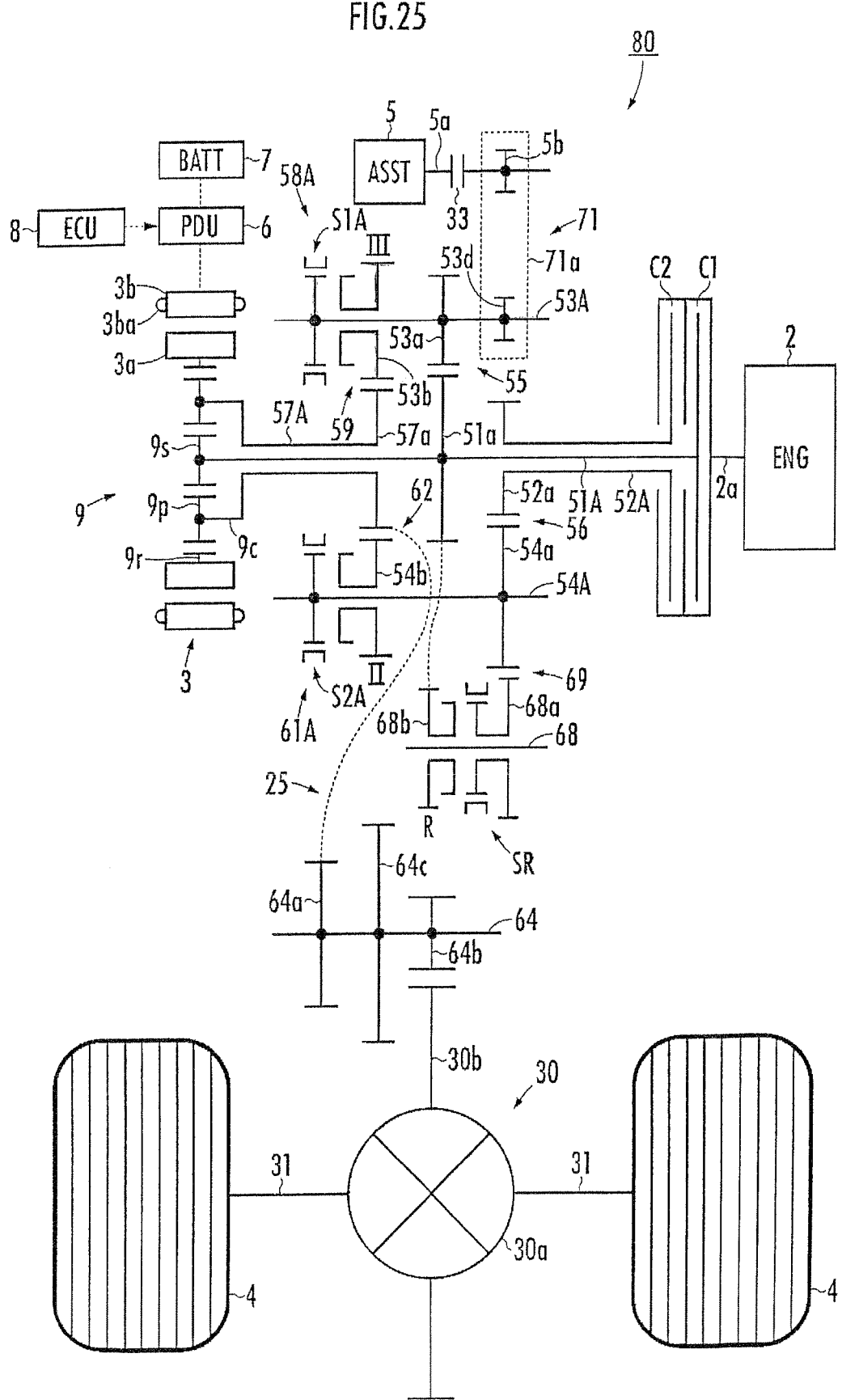
FIG. 25 is a diagram schematically illustrating the general configuration of a vehicle having a power transmitting device for a hybrid vehicle according to a fourth embodiment of the present invention.

Referring to FIG. 25, in the power transmitting device 80, there is disposed a third speed gear 53b, which is connectable to a first sub input shaft 53A via a first synchronizer S1A in the first sub input shaft 53A, and is disposed a second speed gear 54b, which is connectable to a second sub input shaft 54A via a second synchronizer S2A in the second sub input shaft 54A.

Further, a first gear 57a is fixed to an output shaft 57A. The first gear 57a engages with the third speed gear 53b and a second speed gear 54b in common, thereby constituting a third speed gear pair 59 and a second speed gear pair 62, respectively. Moreover, the output shaft 57A and the second sub input shaft 54A are connected to each other via an even-numbered speed gear train 61A.

Although the power transmitting device 80 does not have a fourth speed stage and a fifth speed stage, the power transmission of other variable speed stages and the like is the same as those in the power transmitting device 50 and therefore the description thereof is omitted here. The power transmitting device 80 has less number of variable speed stages than the power transmitting device 50, but is capable of reducing the axial length of the output shaft 2a of the engine 2 and achieving further downsizing, by which the power transmitting device 80 can be installed in a small installation area.

[Fifth Embodiment]

A power transmitting device 90 for a hybrid vehicle according to a fifth embodiment of the present invention will be described below with reference to accompanying drawings.

Figure 26:
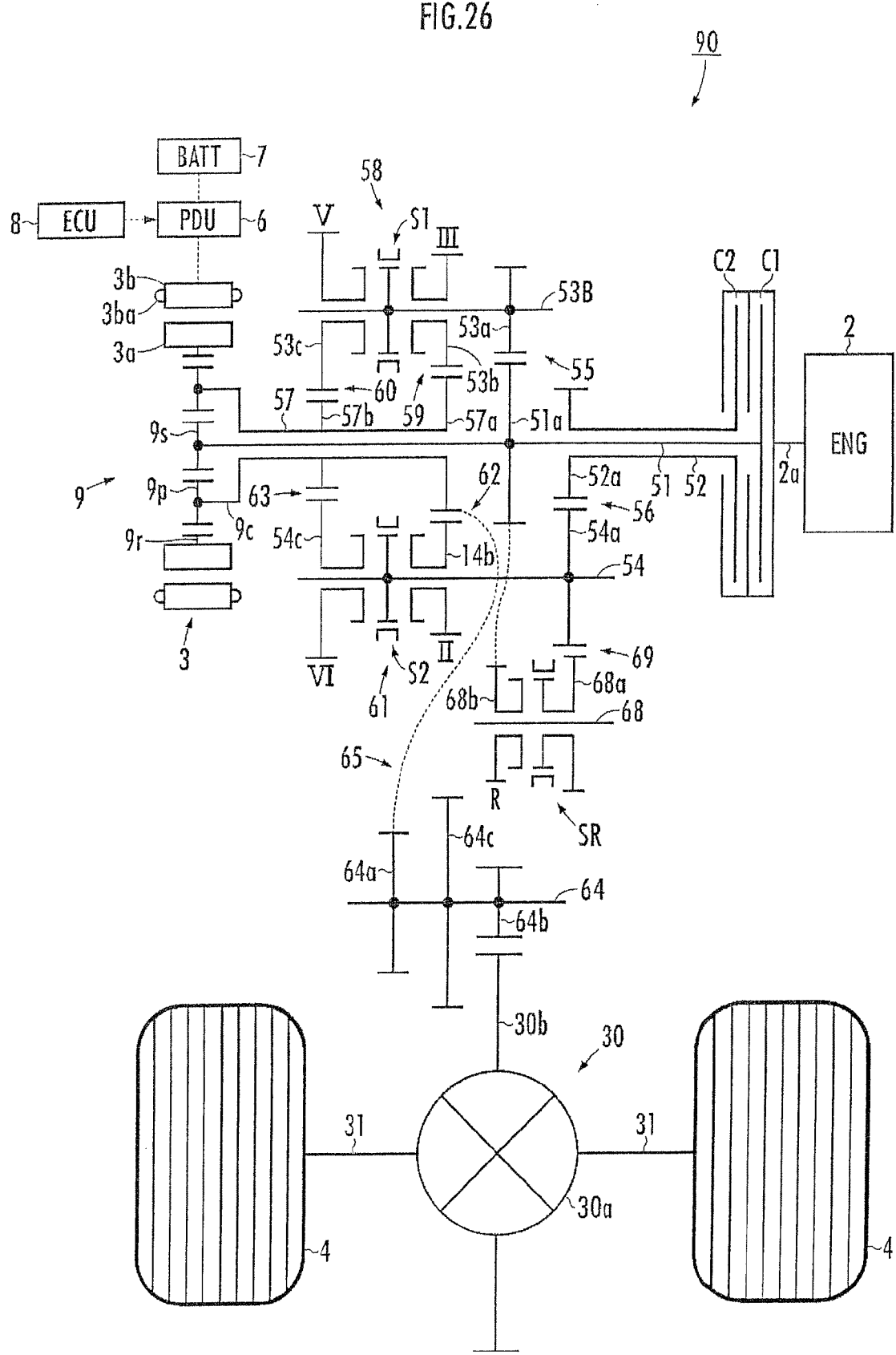
FIG. 26 is a diagram schematically illustrating the general configuration of a vehicle having a power transmitting device for a hybrid vehicle according to a fifth embodiment of the present invention.

Referring to FIG. 26, the power transmitting device 90, which is mounted on a hybrid vehicle, has an engine 2 and an electric motor 3 as power generation sources, but is not configured to be able to drive the auxiliary device 5. In other words, the power transmitting device 90 does not have the auxiliary device 5, the belt mechanism 71, and the auxiliary device clutch 33 in comparison with the power transmitting device 50.

In the power transmitting device 90, a first sub input shaft 53B is not connected to the input shaft 5a of the auxiliary device 5. Therefore, even if the first sub input shaft 53B rotates, the motive power is not transmitted to the auxiliary device 5. The power transmission of elements other than the auxiliary device 5 is the same as in the power transmitting device 50, and therefore the description thereof is omitted here.

The power transmitting device according to the present invention is not limited to the above. For example, in each of the embodiments, there has been described a case where the first main input shaft 11, 11A, or 51 is connected to the sun gear 9s. The second main input shaft 12 or 52, however, may be connected to the sun gear 9s. Moreover, there has been described a case where the gears 18a, 18b, 18c, 53b, and 53c for the odd-numbered speed stages are disposed in the first main input shafts 11 and 11A and in the first sub input shaft 53 and the gears 19a, 19b, 19c, 54b, and 54c for the even-numbered speed stages are disposed in the sub input shafts 13 and 13A and in the second sub input shaft 54. The gears for the even-numbered speed stages, however, may be disposed in the first main input shafts 11 and 11A and in the first sub input shaft 53, and the gears for the odd-numbered speed stages may be disposed in in the sub input shafts 13 and 13A and in the second sub input shafts 54.

Moreover, although there has been described a case where the differential rotation mechanism 9 is formed of a planetary gear unit, a differential device other than the planetary gear unit may be used.

Moreover, in the first and second embodiments, there has been described a case where the first main input shaft 11 or 11A and the rotor 3a of the electric motor 3 are connected to the sun gear 9s, the third speed gear 13a is connected to the carrier 9c, and the synchronizer SL is connected to the ring gear 9r. Further, in the third to fifth embodiments, there has been described a case where the first main input shaft 51 is connected to the sun gear 9s, the output shaft 57 is connected to the carrier 9c, and the rotor 3a of the electric motor is connected to the ring gear 9r. These connections, however, are not limited thereto, but may be modified.

The invention claimed is:

1. A power transmitting device for a hybrid vehicle having an internal combustion engine and an electric motor, the power transmitting device comprising:
    a first main input shaft, which is disposed parallel to an internal combustion engine output shaft, to which motive power is input from the internal combustion engine, and which is connected to the internal combustion engine output shaft by placing a first make-and-break device in a connected state;
    a second main input shaft, which is disposed coaxially with the first main input shaft and connected to the internal combustion engine output shaft by placing second make-and-break device in a connected state;
    an intermediate input shaft disposed parallel to the first main input shaft;
    a sub input shaft disposed parallel to the intermediate input shaft;
    an output shaft, which is disposed parallel to the first main input shaft and outputs motive power to a driven unit via a counter shaft;
    a first gear group, which is disposed on the first main input shaft and is composed of a plurality of gears selectively connected to the output shaft via a first synchronizer;
    a second gear group, which is disposed on the sub input shaft and is composed of a plurality of gears selectively connecting the sub input shaft to the output shaft via a second synchronizer;
    a third gear group, which is fixed to the output shaft and is composed of a plurality of gears engaged with the gears of the first gear group and the gears of the second gear group in common; and
    a differential rotation mechanism composed of a first rotating element, a second rotating element, and a third rotating element so as to be rotatable differentially with respect to one another,
    wherein:
    the first rotating element is connected to the first main input shaft and the electric motor;
    the second rotating element is connected to the first gear group;
    the third rotating element is connected to a fixing mechanism capable of placing the third rotating element in a fixed state; and
    the second rotating element decelerates the motive power transmitted from the first rotating element by using a reaction force from the third rotating element, which is placed in the fixed state by the fixing mechanism.

2. The power transmitting device for a hybrid vehicle according to claim 1, wherein at least one of the first make-and-break element and the second make-and-break element is a dry clutch.

3. The power transmitting device for a hybrid vehicle according claim 1, wherein:
    the differential rotation mechanism is a planetary gear unit coaxially having a sun gear, a ring gear, and a carrier, which rotatably supports a plurality of planetary gears engaged with the sun gear and the ring gear between the sun gear and the ring gear, as three single-pinion type rotating elements; and
    the first rotating element is the sun gear, the second rotating element is the carrier, and the third rotating element is the ring gear.

4. The power transmitting device for a hybrid vehicle according to claim 1, wherein the gears of the first gear group engage with the gears of the third gear group to form a plurality of odd-numbered speed gear pairs and the gears of the second gear group engage with the gears of the third gear group to form a plurality of even-numbered speed gear pairs.

5. The power transmitting device for a hybrid vehicle according to claim 1, wherein the gears of the first gear group engage with the gears of the third gear group to form a plurality of even-numbered speed gear pairs and the gears of the second gear group engage with the gears of the third gear group to form a plurality of odd-numbered speed gear pairs.

6. The power transmitting device for a hybrid vehicle according to claim 1, wherein a part or all of a rotating body, a static part, and an armature winding, which constitute the electric motor are disposed so as to be superposed over the differential rotation mechanism in a direction perpendicular to the direction of axis of the output shaft.

7. The power transmitting device for a hybrid vehicle according to claim 1, further comprising:
    a requested power setting element, which sets requested power requested for the output shaft; and
    a control element, which performs the operation of the internal combustion engine and the operation of the electric motor according to the requested power set by the requested power setting element.

8. The power transmitting device for a hybrid vehicle according to claim 7, wherein the control element controls the operation of the electric motor so that the internal combustion engine performs the operation within a range of a stall region to a maximum rotation region.

9. The power transmitting device for a hybrid vehicle according to claim 7, wherein:
    the control element performs the operation of the internal combustion engine within an appropriate operating region of the internal combustion engine; and
    the control element compares the motive power of the internal combustion engine transmitted from the first rotating element to the second rotating element with the requested power and controls the electric motor to perform a power operation in the case where the motive power of the internal combustion engine is less than the requested power and to perform a regenerative operation in the case where the motive power of the internal combustion engine exceeds the requested power.

10. The power transmitting device for a hybrid vehicle according to claim 7, wherein the control element controls the electric motor to perform the operation at a rated output or maximum rpm in the case where the electric motor performs the operation at an output or rpm exceeding the rated output or the maximum rpm.

* * * * *